US012728470B2

(12) United States Patent
Kawashima et al.

(10) Patent No.: US 12,728,470 B2
(45) Date of Patent: Sep. 8, 2026

(54) JET SOLDERING APPARATUS

(71) Applicant: SENJU METAL INDUSTRY CO., LTD., Tokyo (JP)

(72) Inventors: Yasuji Kawashima, Tokyo (JP); Hiroshi Taguchi, Tokyo (JP); Kyoko Kuramoto, Tokyo (JP); Henri Hanzawa, Tokyo (JP); Tomotake Kagaya, Tokyo (JP); Hirokazu Ichikawa, Tokyo (JP); Katsuhiro Shinohara, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/874,549

(22) PCT Filed: Jun. 12, 2023

(86) PCT No.: PCT/JP2023/021647
§ 371 (c)(1),
(2) Date: Dec. 12, 2024

(87) PCT Pub. No.: WO2023/243575
PCT Pub. Date: Dec. 21, 2023

(65) Prior Publication Data

US 2025/0375827 A1 Dec. 11, 2025

(30) Foreign Application Priority Data

Jun. 13, 2022 (JP) ................................ 2022-094828
Jan. 24, 2023 (JP) ................................ 2023-008559

(51) Int. Cl.
*B23K 3/08* (2006.01)
*B23K 3/06* (2006.01)

(52) U.S. Cl.
CPC ............ *B23K 3/085* (2013.01); *B23K 3/0638* (2013.01)

(58) Field of Classification Search
None
See application file for complete search history.

(56) References Cited

U.S. PATENT DOCUMENTS 4,361,967 A * 12/1982 Bahnsen .............. H05K 3/3494 118/69
5,685,475 A * 11/1997 Jairazbhoy ............ B23K 3/085 228/42

(Continued)

FOREIGN PATENT DOCUMENTS

CN 102485396 A 6/2012
CN 102485400 A 6/2012

(Continued)

OTHER PUBLICATIONS

Office Action in Korean patent application No. 10-2025-7000635 issued on May 15, 2025, with English translation provided by Google Translate.

(Continued)

*Primary Examiner* — Devang R Patel
(74) *Attorney, Agent, or Firm* — Ladas & Parry, LLP

(57) ABSTRACT

A jet soldering apparatus 100 has a storage tank 110 configured to store molten solder; a supply port 125, 135 for supplying the molten solder to a substrate 200; and a cooling unit 310, 330 that is positioned on a downstream side of the supply port 125, 135 in a conveyance direction of the substrate 200, is provided at an upper position of the storage tank 110, and is configured to supply gas.

15 Claims, 16 Drawing Sheets

(56) References Cited

U.S. PATENT DOCUMENTS

| | | | | |
|---|---|---|---|---|
| 6,340,110 | B1 * | 1/2002 | Nakamura | B23K 3/085 228/234.1 |
| 6,575,352 | B2 * | 6/2003 | Takahashi | H05K 3/3494 228/37 |
| 8,403,199 | B2 * | 3/2013 | Sato | B23K 1/085 228/256 |
| 2002/0041485 | A1 | 4/2002 | Kaneko | |
| 2002/0170947 | A1 | 11/2002 | Igarashi et al. | |
| 2011/0247202 | A1 | 10/2011 | Inoue et al. | |

FOREIGN PATENT DOCUMENTS

| | | | | |
|---|---|---|---|---|
| JP | S61-137669 | A | | 6/1986 |
| JP | H01096259 | U | | 6/1989 |
| JP | H09-186451 | A | | 7/1997 |
| JP | 2000-340938 | A | | 12/2000 |
| JP | 2001-308507 | A | | 11/2001 |
| JP | 2002-118353 | A | | 4/2002 |
| JP | 2002-329956 | A | | 11/2002 |
| JP | 2004022709 | A | * | 1/2004 |
| JP | 2004-111472 | A | | 4/2004 |
| JP | 2004-235381 | A | | 8/2004 |
| JP | 2005-294671 | A | | 10/2005 |
| JP | 2007-258487 | A | | 10/2007 |
| JP | 4186635 | B2 | | 11/2008 |
| JP | 2011-222783 | A | | 11/2011 |
| JP | 2011222786 | A | | 11/2011 |
| JP | 2020-163403 | A | | 10/2020 |

OTHER PUBLICATIONS

Decision to Grant a Patent in Japanese Patent Application No. 2024-528827, issued on Jun. 20, 2024.

International Search Report in International Application No. PCT/JP2023/021647, issued on Aug. 29, 2023, with English translation by WIPO.

Written Opinion of the International Searching Authority in International Application No. PCT/JP2023/021647, issued on Aug. 29, 2023, with English translation by WIPO.

International Preliminary Report on Patentability in International Application No. PCT/JP2023/021647, issued on Apr. 1, 2024 and translation provided by applicant's foreign counsel.

Notice of Allowance from corresponding Taiwanese Patent Application No. 112122004 dated Dec. 2, 2024 with search report, and English translation by Google Translate.

Supplementary European Search Report in EP patent Application No. 23823865.3, issued on Sep. 16, 2025.

* cited by examiner

[FIG. 1]
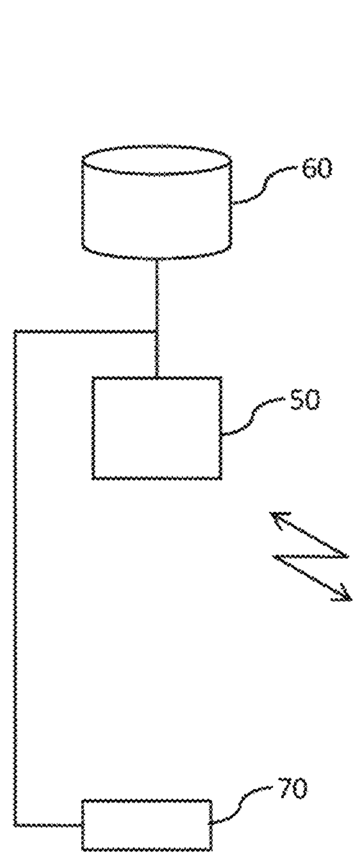
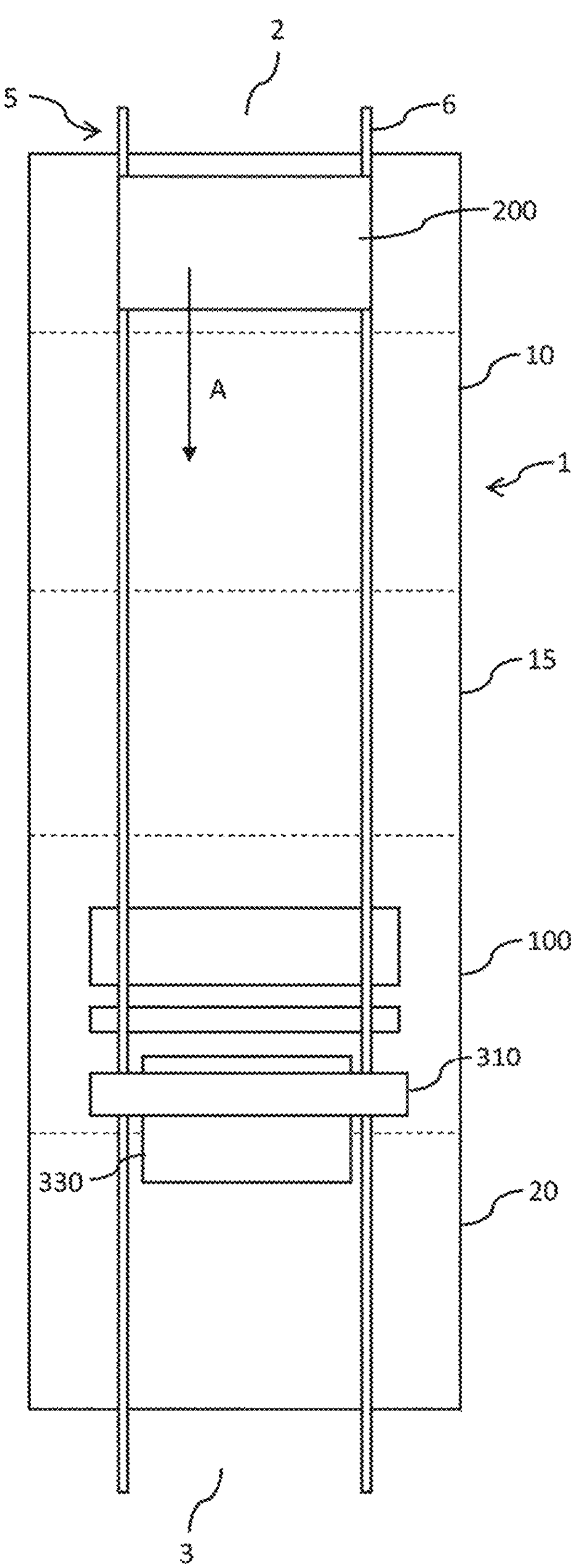

[FIG. 2]
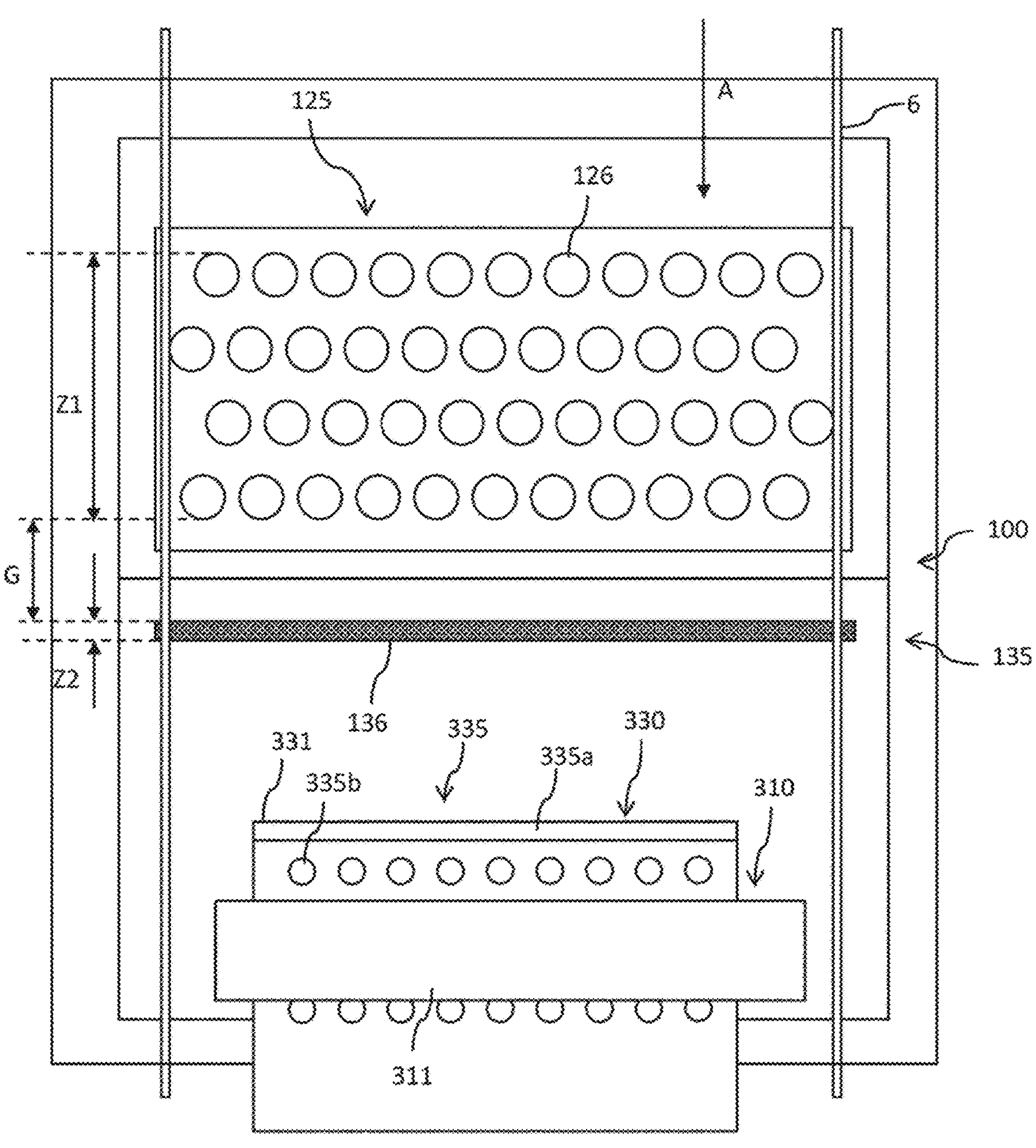

[FIG. 3]
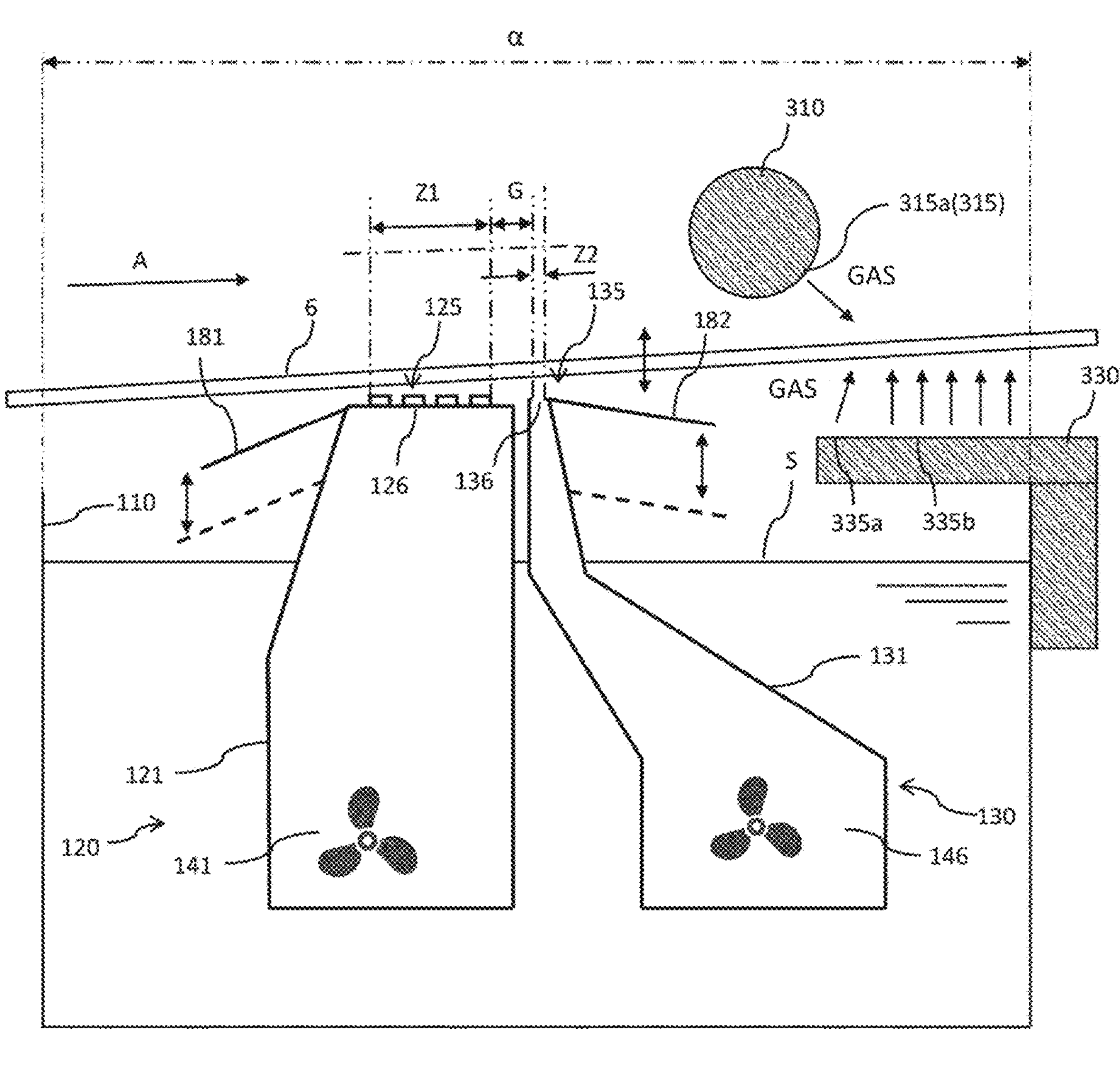

[FIG. 4]
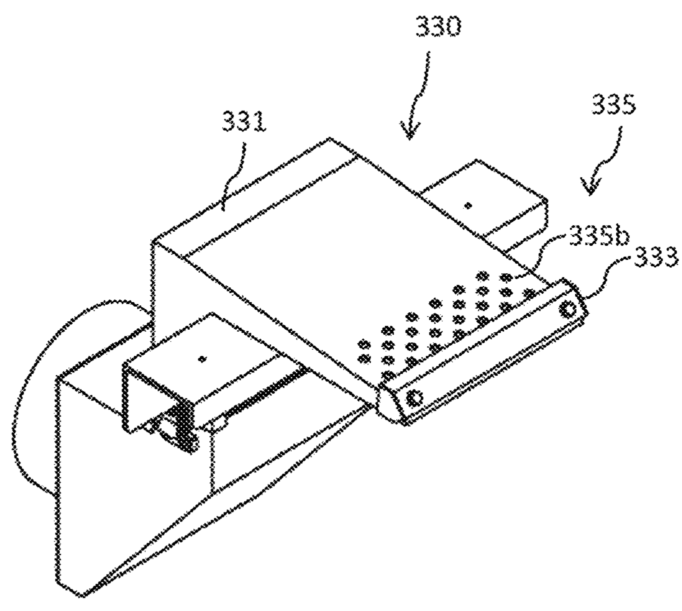
[FIG. 5]
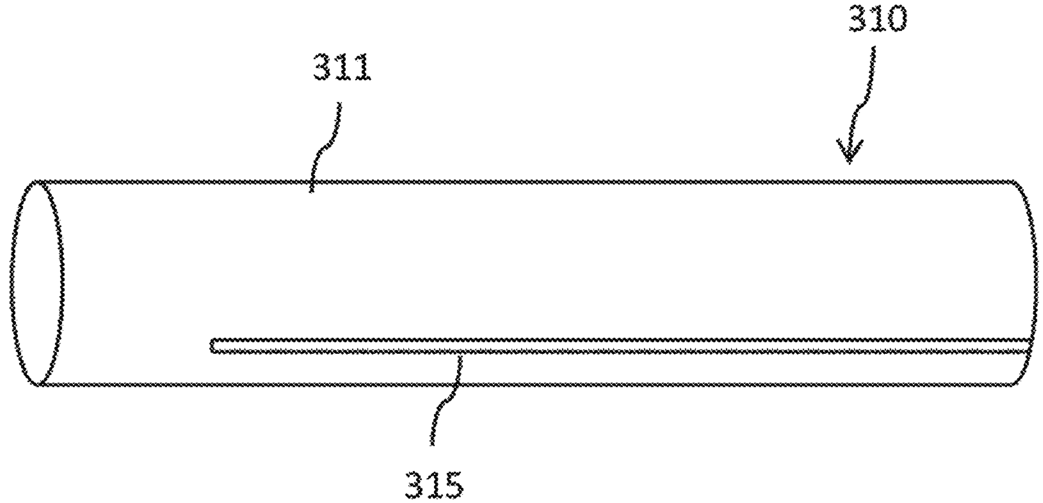

[FIG. 6]
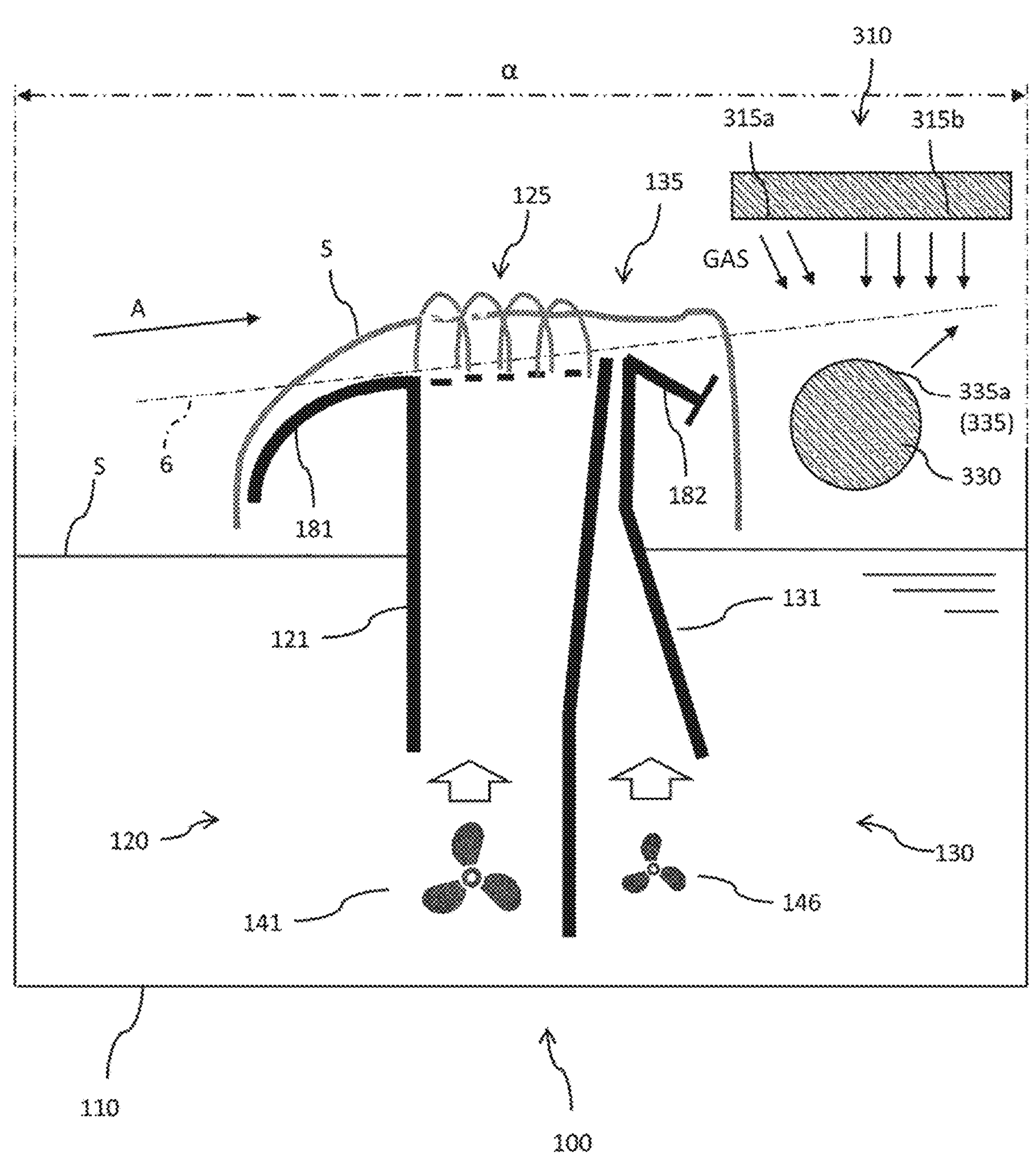

[FIG. 7]
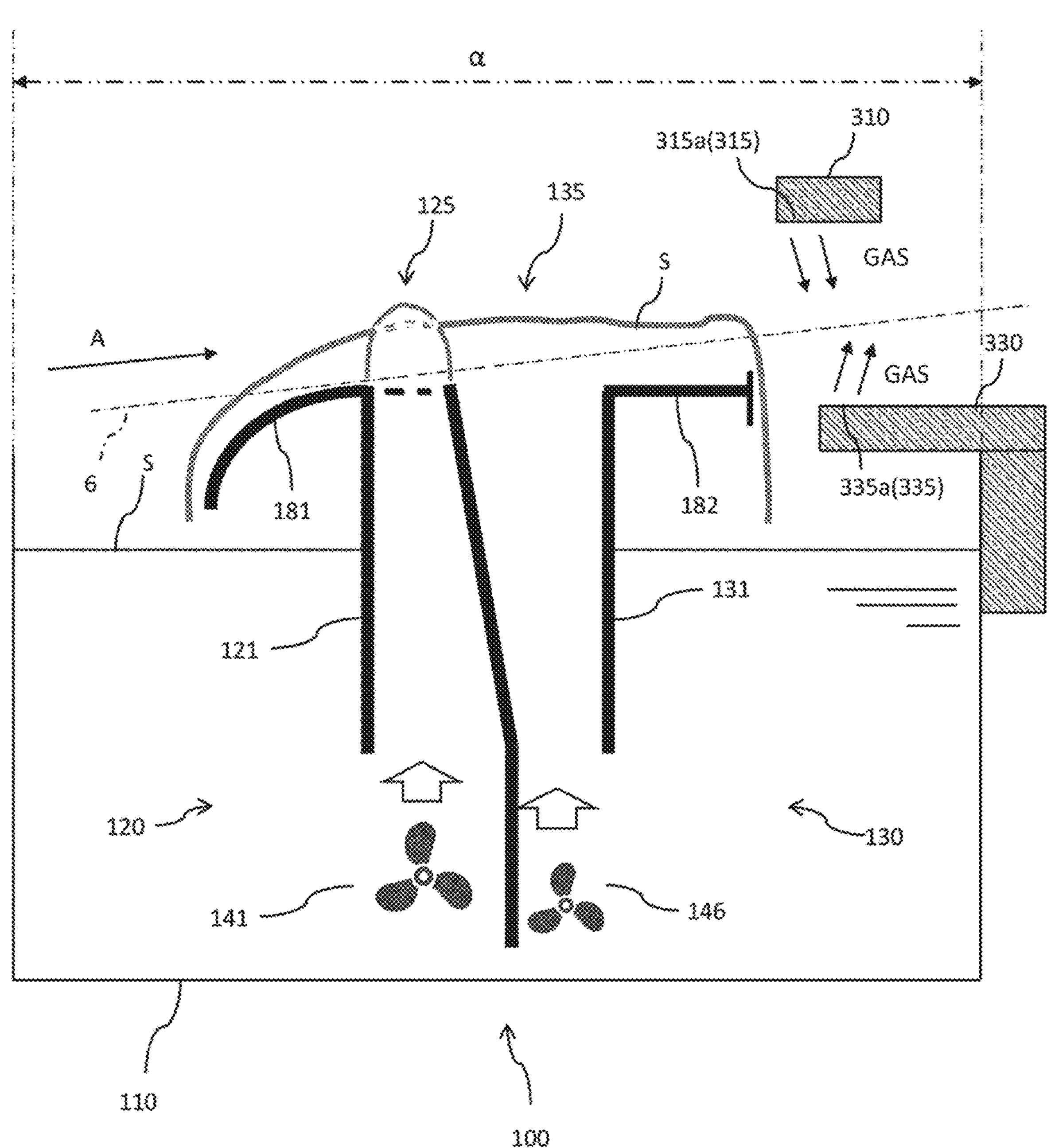

[FIG. 8]
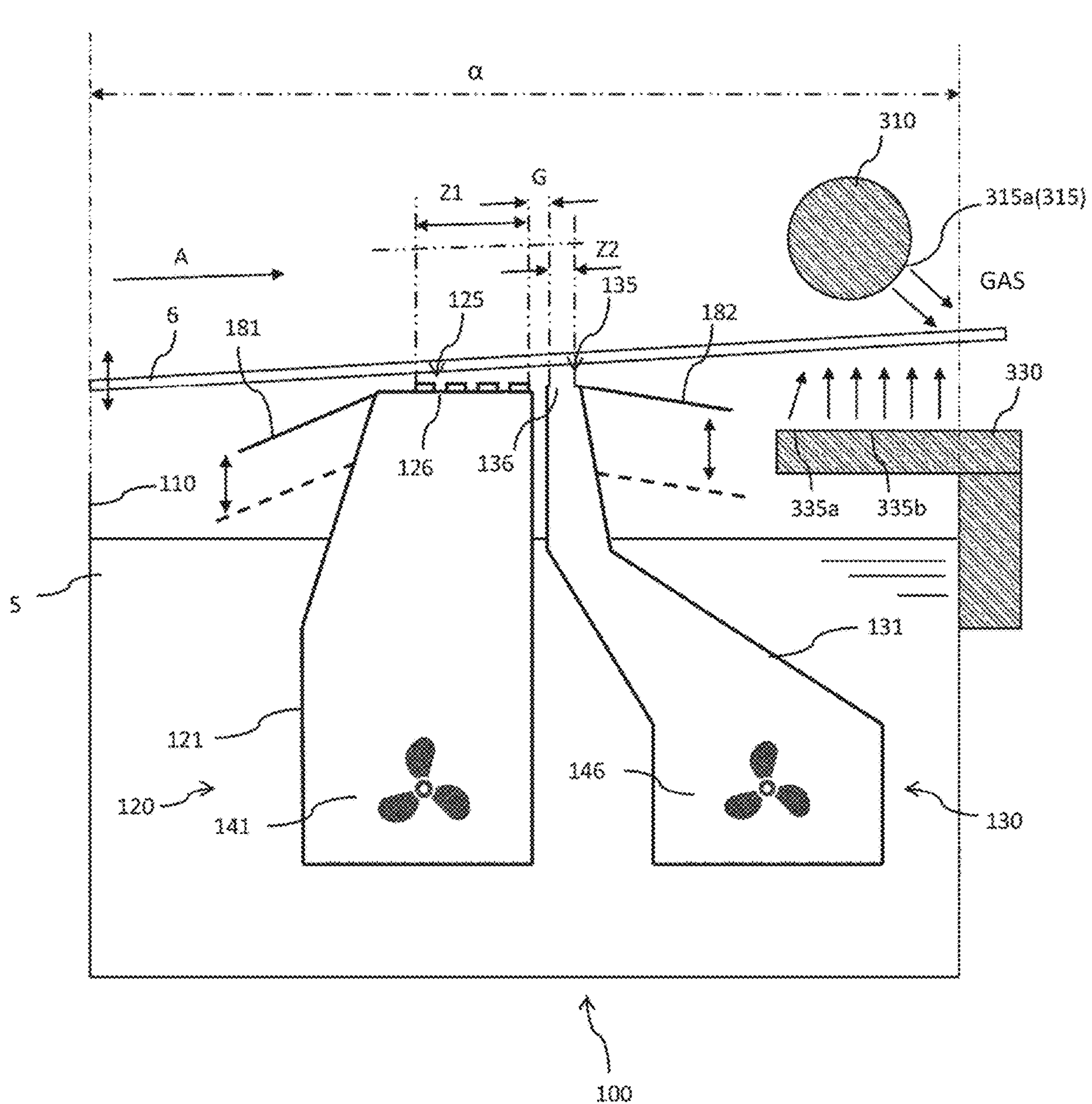

[FIG. 9]
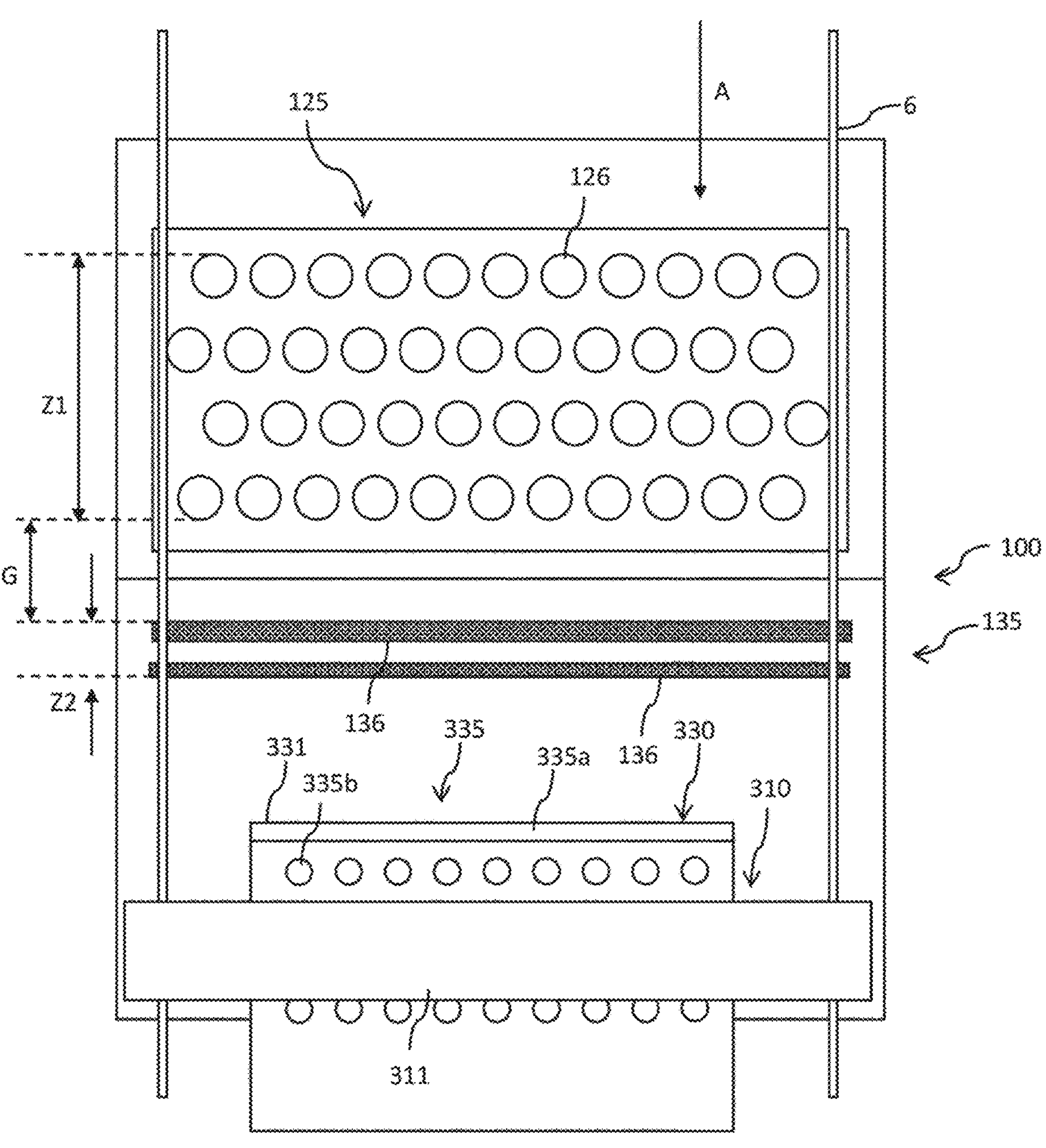

[FIG. 10]
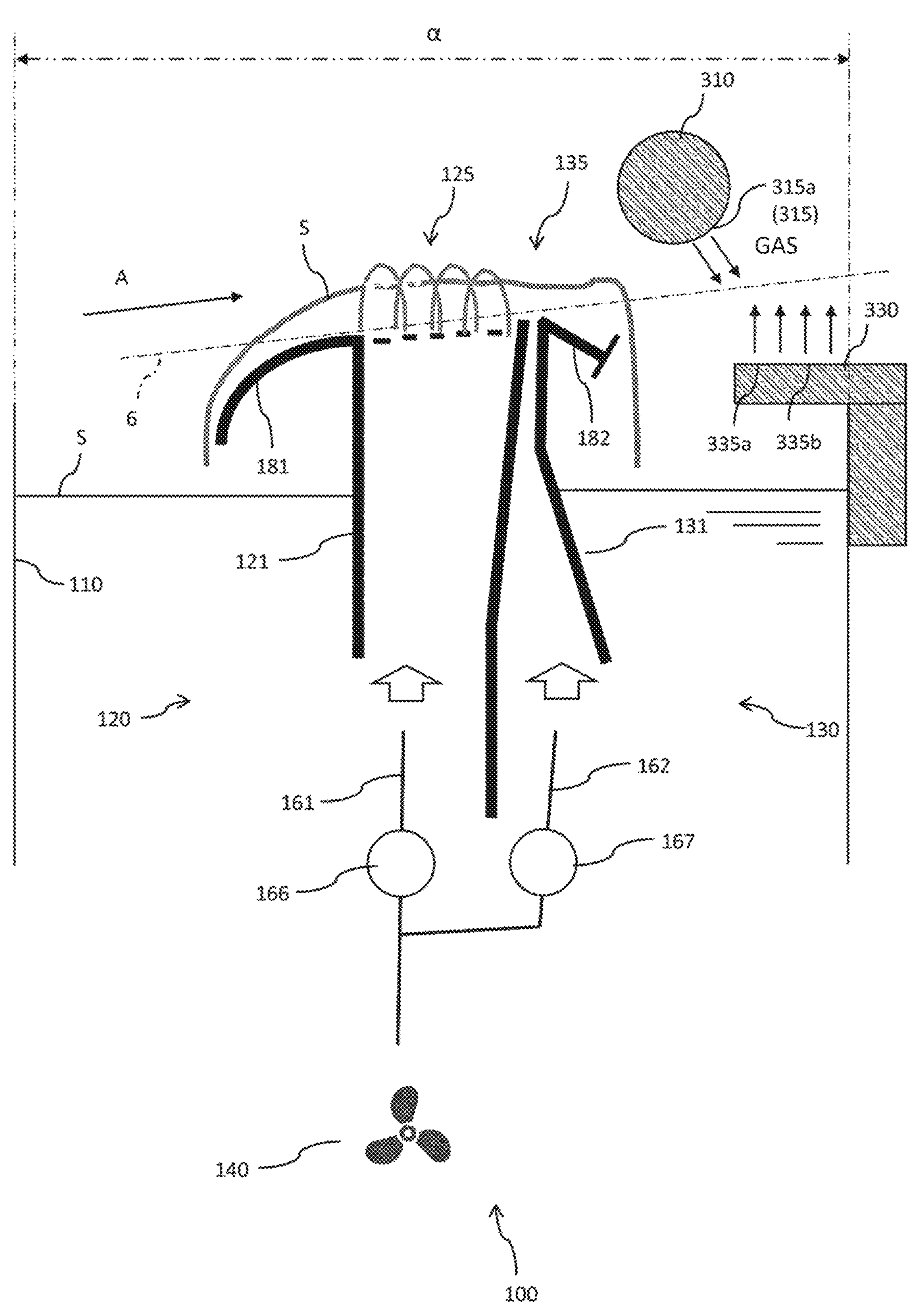

[FIG. 11]
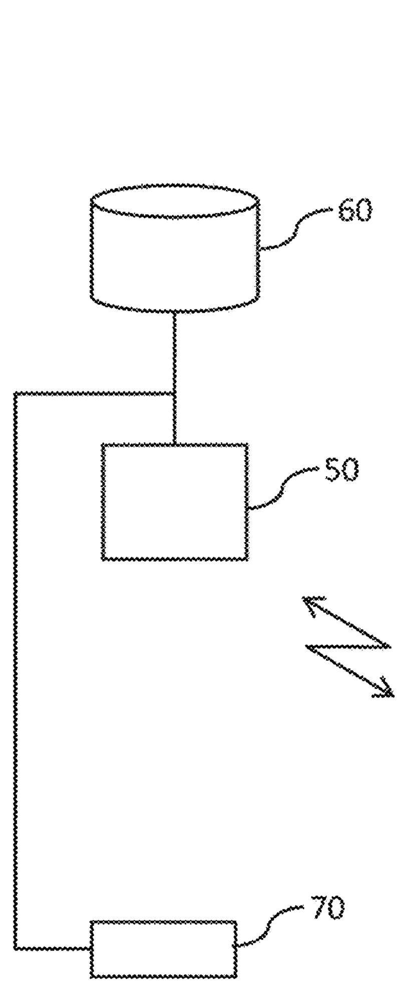
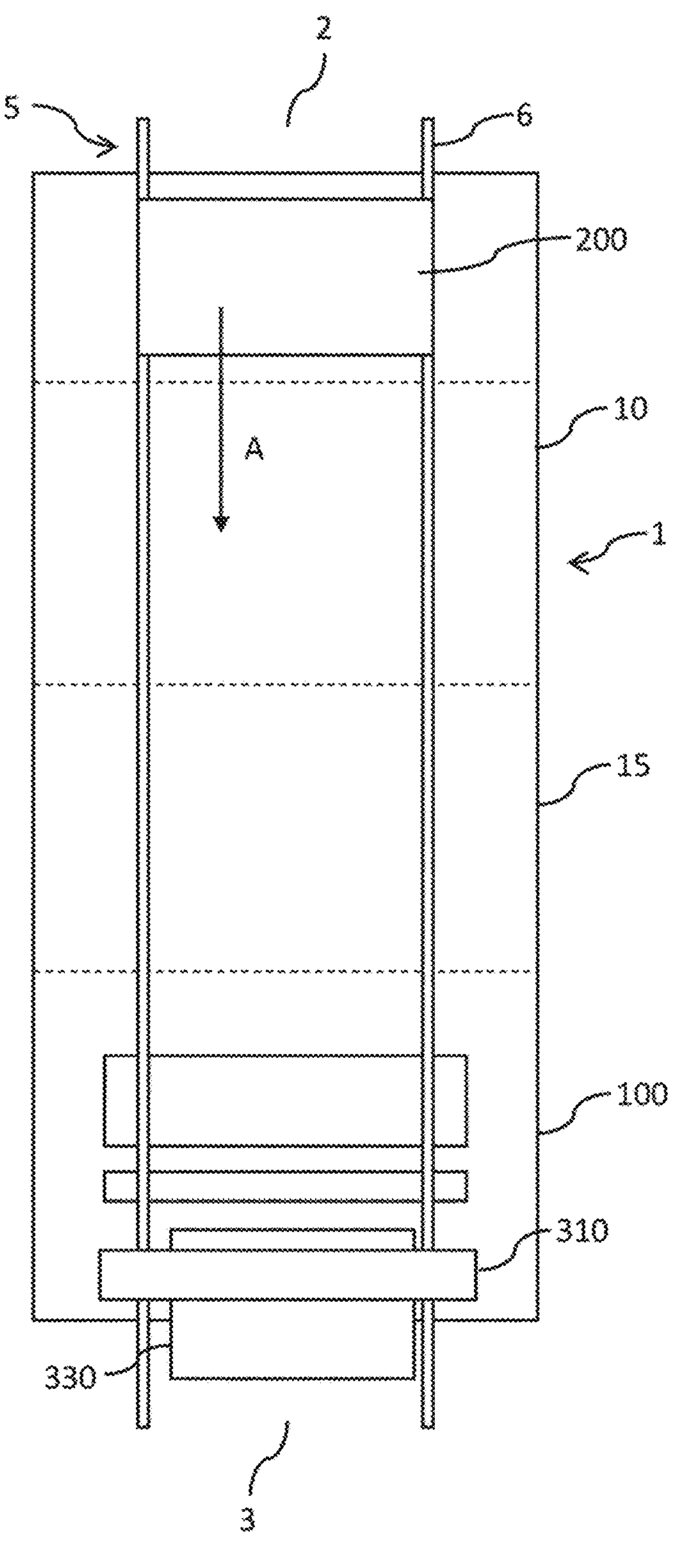

[FIG. 12]
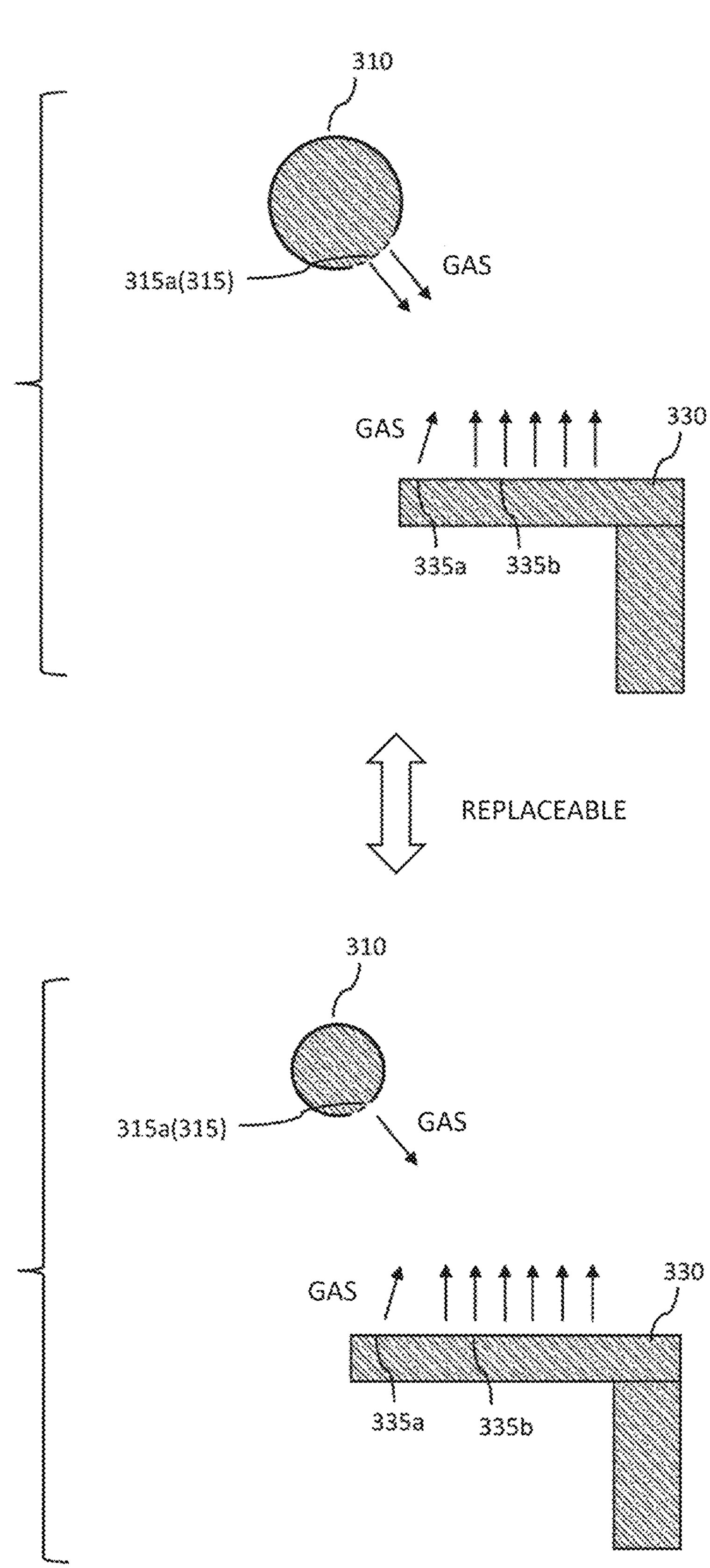

[FIG. 13]
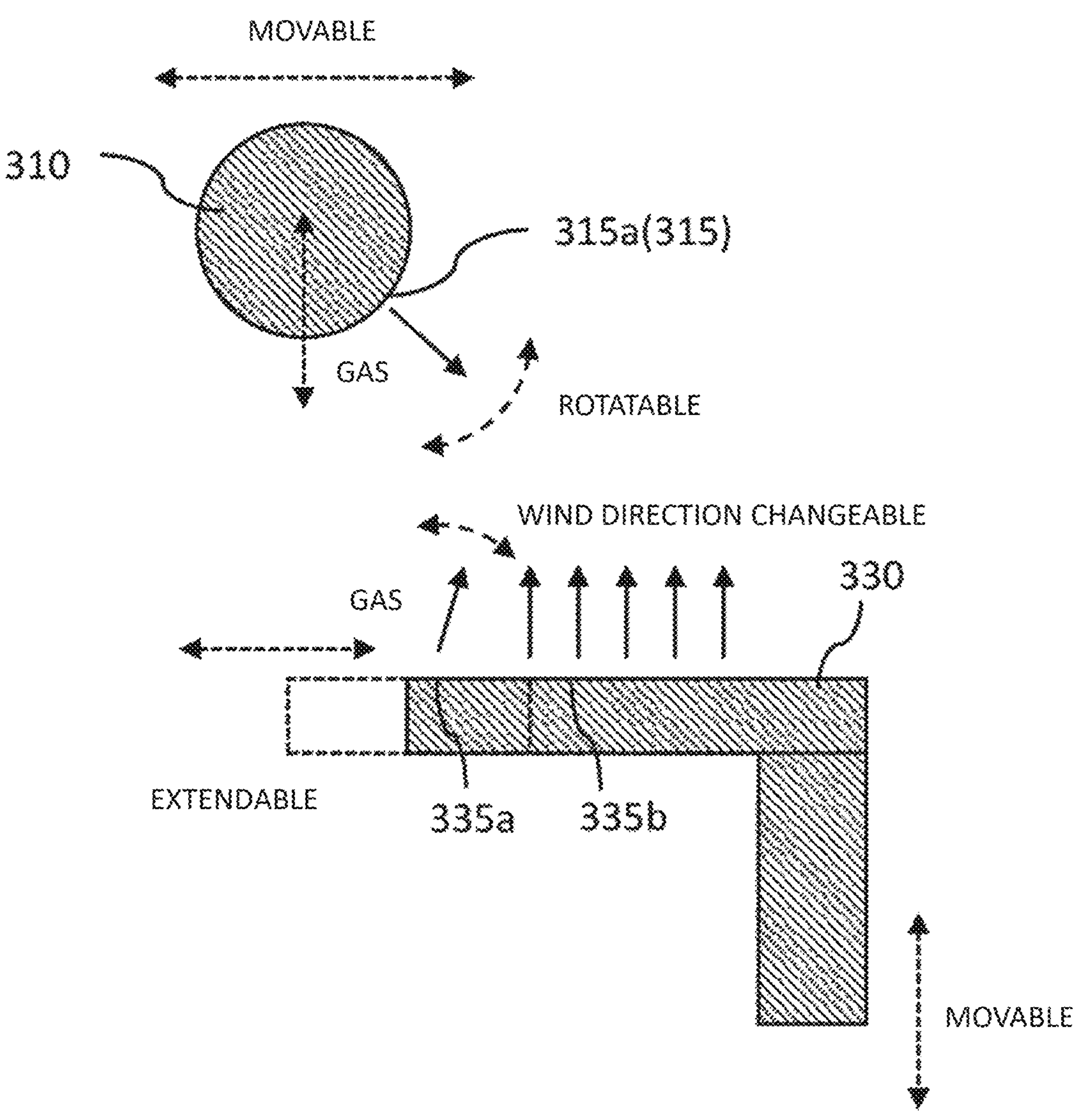

[FIG. 14]
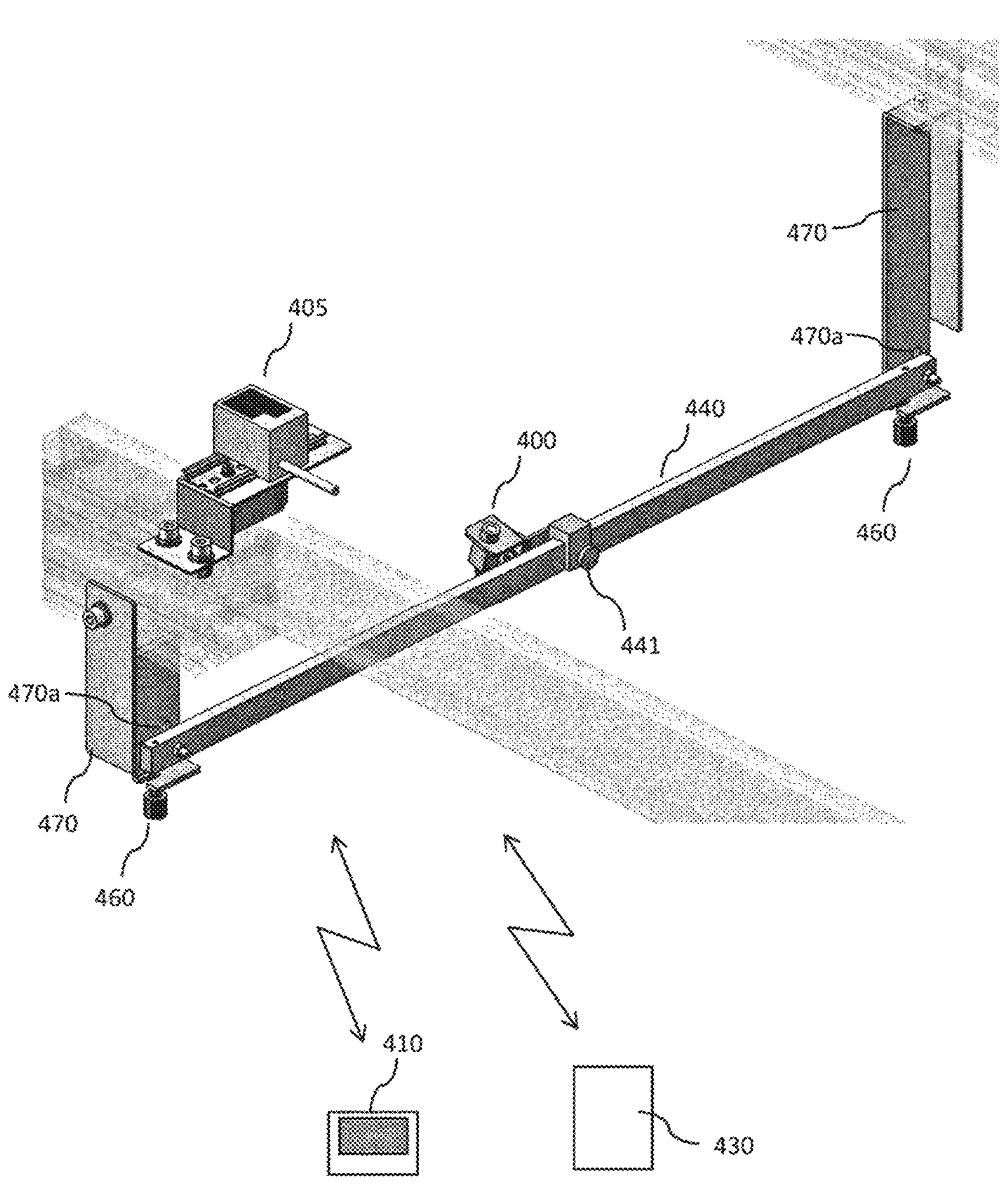

[FIG. 15A]
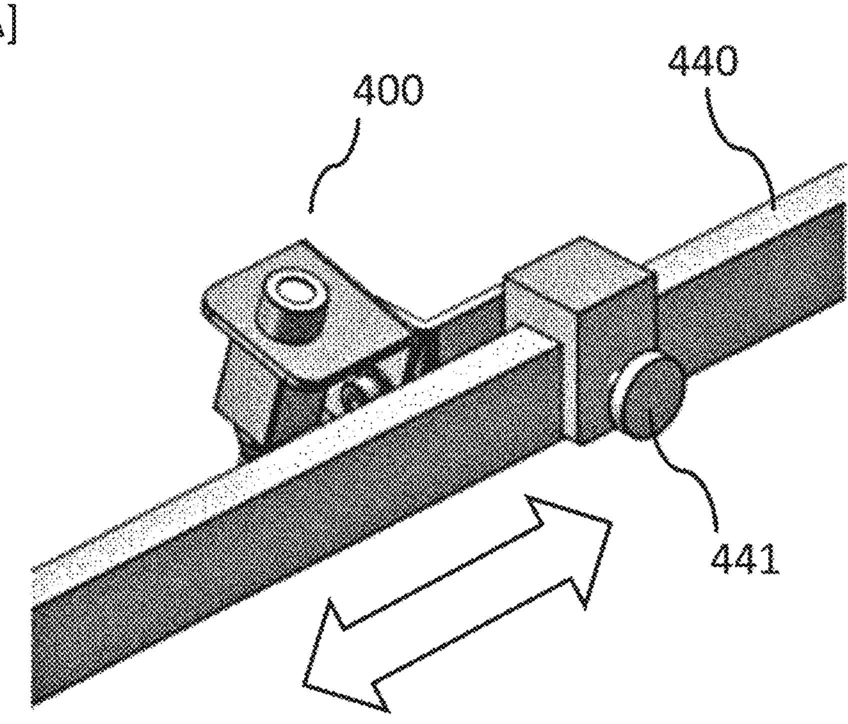
[FIG. 15B]
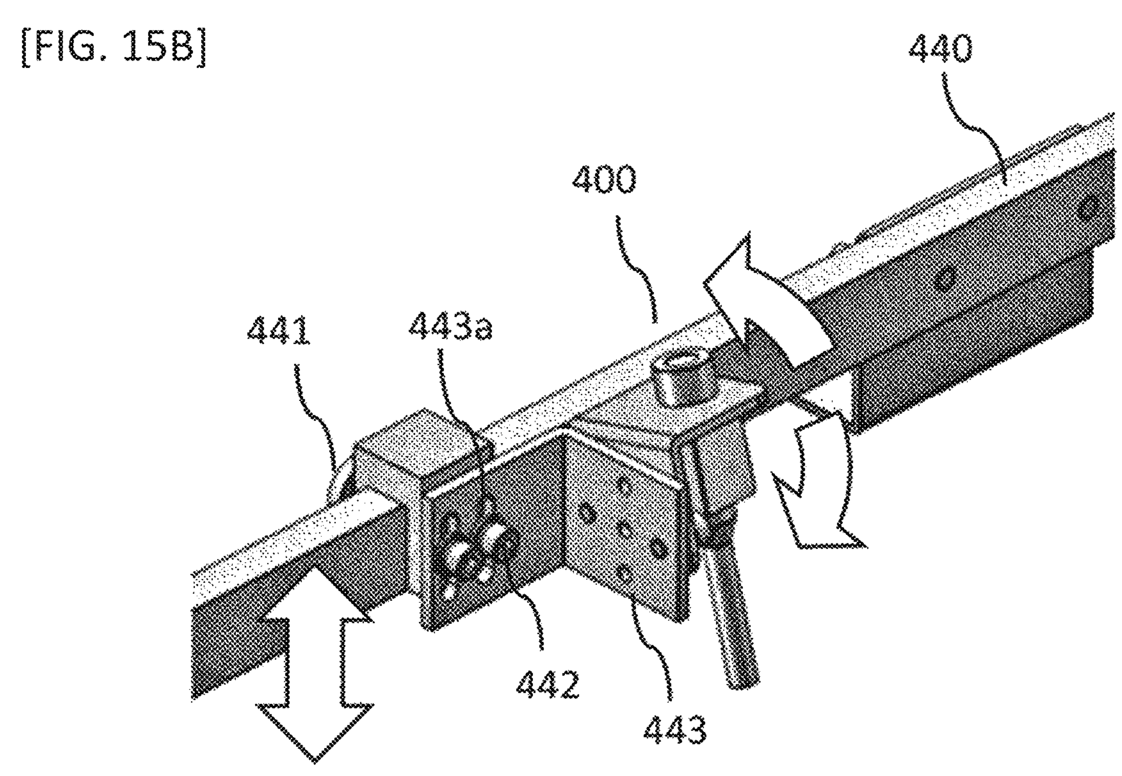

[FIG. 16]
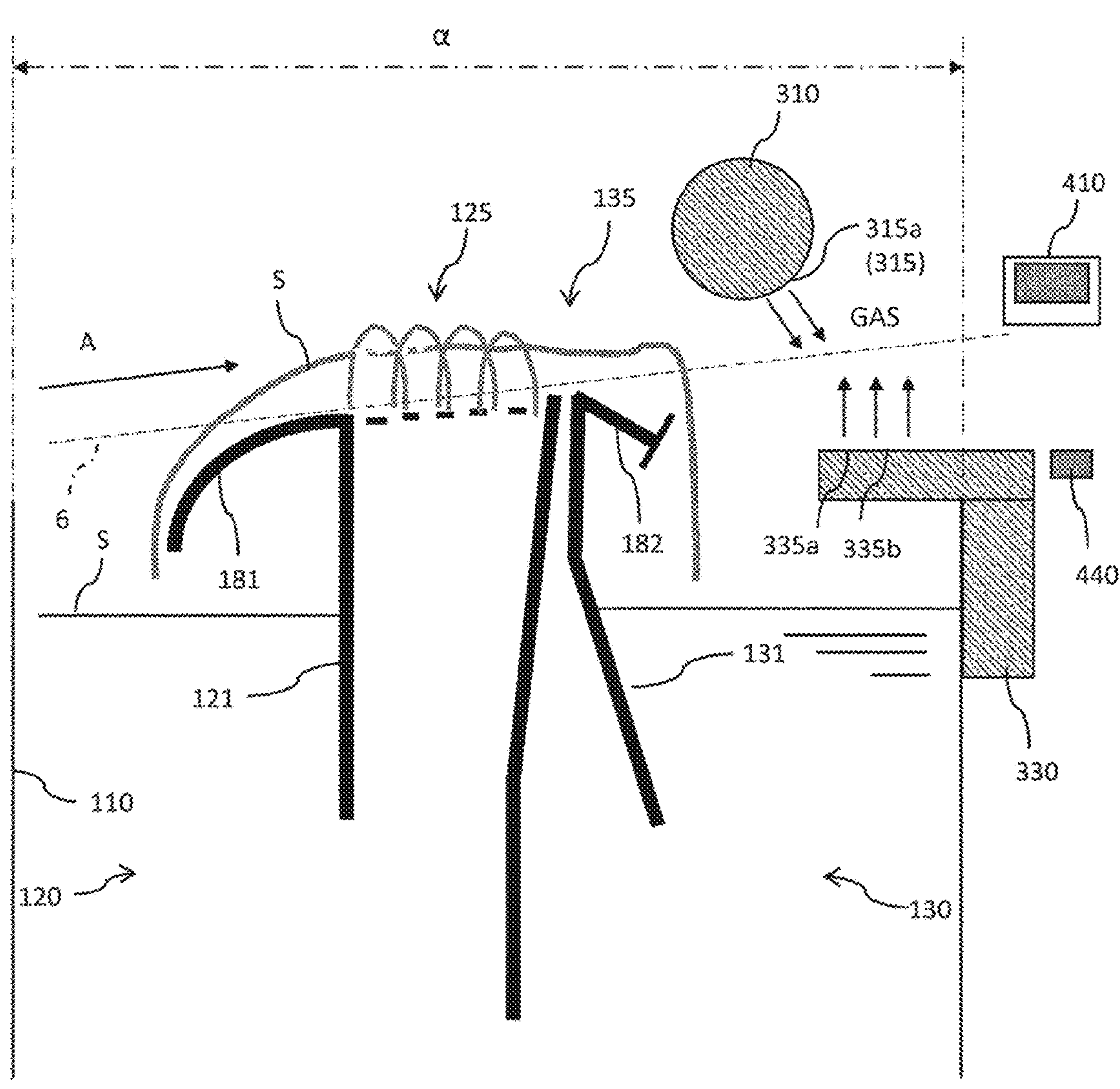

[FIG. 17]
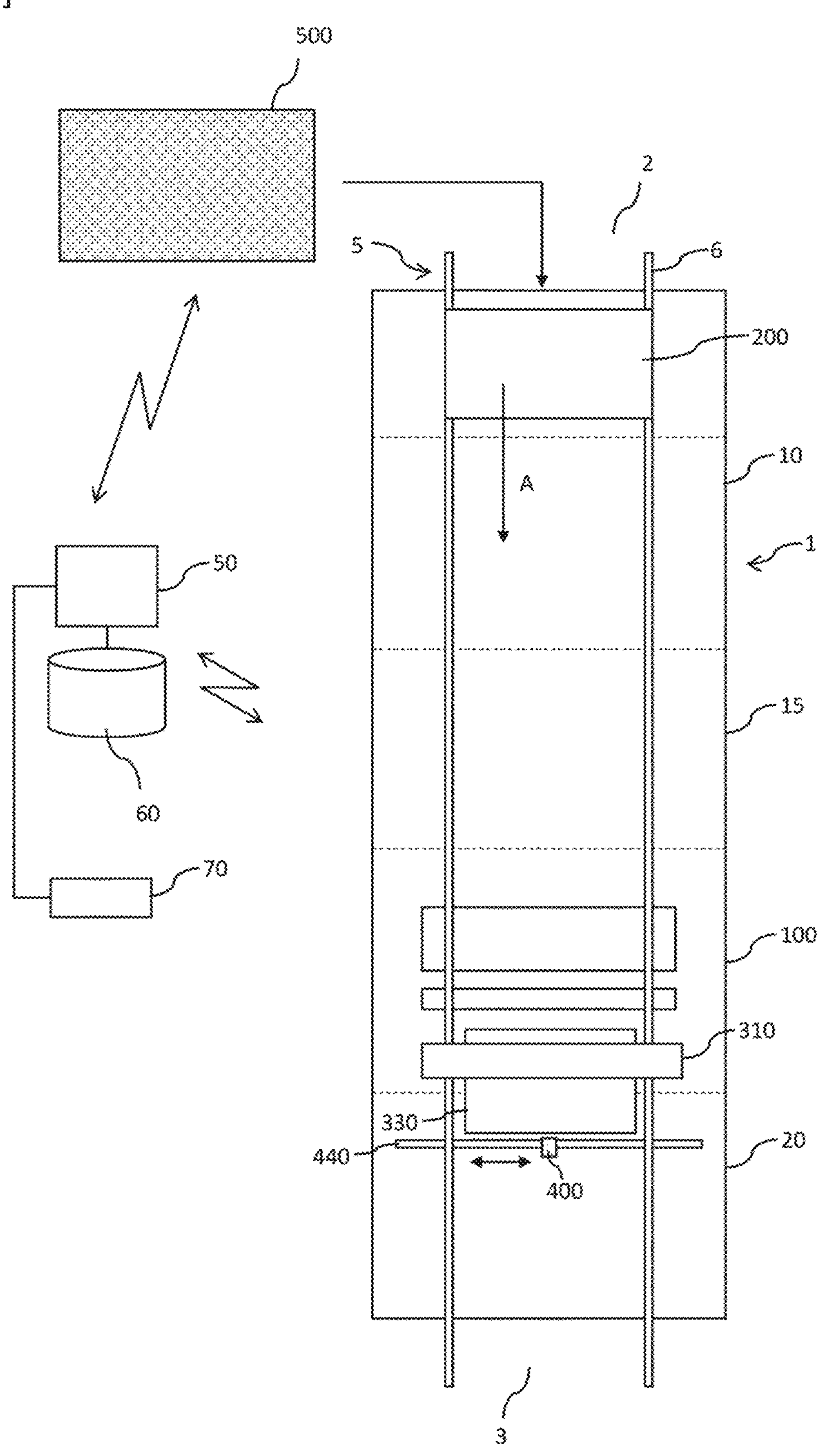

JET SOLDERING APPARATUS

CROSS-REFERENCE TO RELATED APPLICATIONS

The present disclosure is the national stage application of International Application No. PCT/JP2023/021647 filed on Jun. 12, 2023, which claims priority to Japanese Application No. 2022-094828 filed on Jun. 13, 2022, and Japanese Application No. 2023-008559 filed on Jan. 24, 2023, the disclosures of which are incorporated in their entireties by reference herein.

TECHNICAL FIELD

The present invention relates to a jet soldering apparatus that supplies molten solder to a substrate.

BACKGROUND ART

In the related art, a jet soldering apparatus for supplying molten solder to a substrate is known, and a cooling zone for cooling the substrate is installed. For example, JP 2011-222783 A discloses that a cooler 56 is installed along with a preheater 52 and a jet solder tank 80, and the substrate is cooled by the cooler 56.

SUMMARY OF INVENTION

Problem to be Solved by Invention

As a result of examination by the inventors, it has been found that when the substrate is not cooled to the cooling zone in which the cooler disclosed in JP 2011-222783 A is installed, curing of the solder may be insufficient. Particularly in a case of low-temperature molten solder, insufficient curing of the solder may cause embrittlement of the solder.

The present invention provides a jet soldering apparatus capable of more reliably preventing embrittlement of solder by cooling the solder at an earlier timing as compared with an aspect using only a cooling zone in the related art.

Means for Solving Problem

[Concept 1]

A jet soldering apparatus according to the present invention may comprise:

- a storage tank configured to store molten solder;
- a supply port for supplying the molten solder to a substrate; and
- a cooling unit that is positioned on a downstream side of the supply port in a conveyance direction of the substrate, is provided at an upper position of the storage tank, and is configured to supply gas.

[Concept 2]

In the jet soldering apparatus according to concept 1,

- the cooling unit may have a lower cooling unit configured to supply the gas from below to the substrate conveyed, and an upper cooling unit configured to supply the gas from upper to the substrate conveyed.

[Concept 3]

In the jet soldering apparatus according to concept 2,

- the lower cooling unit may be positioned on a downstream side of the upper cooling unit in the conveyance direction of the substrate.

[Concept 4]

In the jet soldering apparatus according to any one of concepts 1 to 3,

- the cooling unit may supply the gas toward a downstream side of the conveyance direction of the substrate.

[Concept 5]

In the jet soldering apparatus according to concept 4,

- the cooling unit may have a lower cooling unit configured to supply the gas from below to the substrate conveyed, and an upper cooling unit configured to supply the gas from upper to the substrate conveyed,
- the upper cooling unit may supply the gas toward obliquely downward along the conveyance direction of the substrate, and
- the lower cooling unit may supply the gas toward obliquely upward along the conveyance direction of the substrate.

[Concept 6]

In the jet soldering apparatus according to any one of concepts 1 to 5,

- the cooling unit may have a first cooling unit for cooling the solder supplied to the substrate, and a second cooling unit for cooling the substrate.

[Concept 7]

In the jet soldering apparatus according to any one of concepts 1 to 6,

- the cooling unit may supply air at a room temperature as the gas.

[Concept 8]

In the jet soldering apparatus according to any one of concepts 1 to 7,

- the supply port may have a first supply port for supplying the molten solder provided at a first housing, and a second supply port for supplying the molten solder provided at a second housing, and
- a part where the molten solder falls may not be provided between the first supply port and the second supply port along the conveyance direction of the substrate.

[Concept 9]

The jet soldering apparatus according to any one of concepts 1 to 8 may comprise a measurement unit that measures a temperature of the substrate after being cooled by the cooling unit.

[Concept 10]

The jet soldering apparatus according to concept 9 may comprise a display unit that displays the temperature of the substrate measured by the measurement unit.

[Concept 11]

In the jet soldering apparatus according to concept 9 or 10,

- wherein when the temperature of the substrate measured by the measurement unit is out of a predetermined temperature range, a signal may be transmitted for stopping a carry-in of the substrate.

[Concept 12]

The jet soldering apparatus according to any one of concepts 9 to 11 may comprise a notification unit that notifies that the temperature of the substrate is out of a predetermined temperature range when the temperature of the substrate measured by the measurement unit is out of the predetermined temperature range.

Effect of Present Invention

The present invention provides a jet soldering apparatus capable of more reliably preventing embrittlement of solder by cooling the solder at an earlier timing as compared with an aspect using only a cooling zone in the related art.

BRIEF DESCRIPTION OF FIGURES

FIG. 1 is an upper plan view illustrating a soldering apparatus according to the present embodiment.

FIG. 2 is an upper plan view of a jet soldering apparatus according to the present embodiment.

FIG. 3 is a schematic side sectional view illustrating a first aspect of the jet soldering apparatus according to the present embodiment.

FIG. 4 is a perspective view illustrating an example of a lower cooling unit according to the present embodiment.

FIG. 5 is a perspective view illustrating an example of an upper cooling unit according to the present embodiment.

FIG. 6 is a schematic view illustrating a second aspect of the jet soldering apparatus according to the present embodiment.

FIG. 7 is a schematic view illustrating a third aspect of the jet soldering apparatus according to the present embodiment.

FIG. 8 is a schematic side sectional view illustrating a fourth aspect of the jet soldering apparatus according to the present embodiment.

FIG. 9 is an upper plan view illustrating an aspect in which two slit-shaped second openings are provided in the present embodiment.

FIG. 10 is a schematic side sectional view illustrating a fifth aspect of the jet soldering apparatus according to the present embodiment.

FIG. 11 is a schematic view illustrating an aspect in which a cooling zone is not installed in the soldering apparatus according to the present embodiment.

FIG. 12 is a schematic side sectional view illustrating an aspect in which an upper main body of the upper cooling unit and a lower main body of the lower cooling unit are replaceable.

FIG. 13 is a schematic side sectional view illustrating an aspect in which the upper main body of the upper cooling unit is movable in a horizontal direction and a vertical direction, and the lower main body of the lower cooling unit is movable in the horizontal direction and the vertical direction.

FIG. 14 is a perspective view illustrating a measurement unit, a guide part, and the like, and illustrating that the measurement unit can communicate with a display unit and a notification unit.

FIG. 15A is an enlarged perspective view of the measurement unit.

FIG. 15B is an enlarged perspective view of the measurement unit, and is a perspective view illustrating a side opposite to FIG. 15A.

FIG. 16 is a schematic side sectional view illustrating an aspect in which the guide part and the display unit are installed.

FIG. 17 is an upper plan view illustrating the soldering apparatus in which the measurement unit and the guide part are installed.

EMBODIMENT OF THE INVENTION

Embodiment

«Configuration»

A soldering apparatus illustrated in FIG. 1 is an apparatus that performs soldering processing on a substrate 200 on which electronic components such as semiconductor elements, resistors, and capacitors are mounted on a circuit. Typically, the electronic components and the like are positioned on a lower side of the substrate 200. The soldering apparatus has a main body 1 and a conveyance unit 5 that conveys the substrate 200. The main body 1 has a carry-in port 2 through which the substrate 200 is carried in and a carry-out port 3 through which the substrate 200 is carried out. The substrate 200 may be conveyed at a predetermined angle, for example, an inclination of about 3 to 6 degrees when viewed from the side (see FIG. 3). In this case, a downstream side is positioned at a higher position than an upstream side in a substrate conveyance direction A. However, the present invention is not limited thereto, and the substrate 200 may be horizontally conveyed, for example. The conveyance unit 5 may have a conveyance driver (not illustrated) that applies a driving force, and a conveyance rail 6 that guides the substrate 200. As the conveyance rail 6, aluminum, iron, stainless steel, or the like may be used.

As illustrated in FIG. 1, the main body 1 may be provided with a fluxer 10 for applying flux to the substrate 200, a preheater unit 15 for preheating the substrate 200 coated with flux, a jet soldering apparatus 100 for jetting molten solder into contact with the substrate 200, and a cooler 20 for cooling the soldered substrate 200. The substrate 200 conveyed along the conveyance rail 6 of the conveyance unit 5 sequentially passes through the fluxer 10, the preheater unit 15, the jet soldering apparatus 100, and the cooler 20. A part where the cooler 20 is provided is a cooling zone. However, as will be described later, in the present embodiment, cooling units such as an upper cooling unit 310 and a lower cooling unit 330 are provided. Therefore, as illustrated in FIG. 11, the cooling zone may not be provided without installing the cooler 20. The jet soldering apparatus 100 may have a control unit 50 that gives a command to each component to control, and a storage unit 60 that stores various pieces of information. Note that in FIG. 1, the soldering apparatus is illustrated in an upper plan view except for the control unit 50, the storage unit 60, and an operation unit 70 described later.

The fluxer 10 is used to apply flux to the conveyed substrate 200. The flux may include a solvent, an activator, and the like. The fluxer 10 may be provided with a plurality of coating apparatuses. The type of flux may be selectively used according to the type of solder and the type of the substrate 200.

The preheater unit 15 heats the substrate 200 to uniformly raise the substrate 200 to a predetermined temperature. When the substrate 200 is heated in this manner, the solder is easily attached to a predetermined part of the substrate 200. For example, a halogen heater is used as the preheater unit 15. The halogen heater can rapidly heat the substrate 200 to a set temperature. Furthermore. The substrate 200 may be heated by blowing gas (hot air) heated by the heater onto the substrate 200 by a fan. Furthermore, as the preheater unit 15, a far-infrared panel heater or the like may be used.

The cooler 20 has a cooling fan which is not illustrated, and cools the substrate 200 soldered by the jet soldering apparatus 100. The control of the cooling fan may be only ON and OFF, but the wind speed may be adjusted. Furthermore, as the cooler 20, a chiller or the like may be used to cool the substrate 200 to a predetermined temperature.

The control unit 50 illustrated in FIG. 1 is communicably connected to the conveyance unit 5 including the conveyance rail 6, the fluxer 10, the preheater unit 15, the jet soldering apparatus 100, the cooler 20, the operation unit 70, and the storage unit 60. The communicable connections include both wired and wireless connections. The operation unit 70 may have a liquid crystal display panel, a numeric keypad, or the like, and is typically a personal computer, a smartphone, a tablet, a touch panel or the like. When an operator operates the operation unit 70, the control unit 50 may control a conveyance speed by the conveyance unit 5, a timing of conveying the substrate 200, a temperature of the flux at the fluxer 10, an application amount of the flux, a temperature of the preheater unit 15, a temperature of molten solder S of the jet soldering apparatus 100, a jet amount, a jet speed, ON and OFF of the cooling fan of the cooler 20, and the like. The storage unit 60 may store information input by the operation unit 70, an instruction of the control unit 50, an operating time of the jet soldering apparatus 100, and the like. The conveyance speed of the substrate 200 is about 1 to 3 cm per second.

Next, the jet soldering apparatus 100 of the present embodiment will be described.

As illustrated in FIG. 3, the jet soldering apparatus 100 may have a storage tank 110 that stores molten solder S, a supply port for supplying the molten solder S to the substrate 200, and a cooling unit that is positioned on the downstream side (right side in FIG. 3) of the supply port in the conveyance direction of the substrate 200, is provided at an upper position of the storage tank 110, and includes the lower cooling unit 330 and/or the upper cooling unit 310 that supplies gas for cooling the solder supplied to the substrate 200 and attached to the substrate 200. The supply port may have two types of a first supply port 125 and a second supply port 135. Then, molten solder S may be jetted from the first supply port 125 by receiving a driving force from a first pump 141 that is a first drive unit, and molten solder S may be jetted from a second supply port 135 by receiving a driving force from a second pump 146 that is a second drive unit.

The molten solder S jetted from the first supply port 125 and the second supply port 135 is jetted upward from below. The molten solder S having received the driving force from the first pump 141 is pressure-fed in a duct and jetted toward the substrate 200 to attach the solder to a predetermined part of the substrate 200. Similarly, the molten solder S having received the driving force from the second pump 146 is pressure-fed in a duct and jetted toward the substrate 200 to attach the solder to a predetermined part of the substrate 200. The molten solder S is heated to a temperature of, for example, about 160° C. to 260° C. by a heater which is not illustrated. The molten solder supplied from the first supply port 125 and the second supply port 135 may be circulated and used. In this case, it may be circulated through a filter which is not illustrated. Each of the first pump 141 and the second pump 146 is typically constituted of one pump, but each of the first pump 141 and the second pump 146 may be constituted of a plurality of pumps.

The first supply port 125 of the jet soldering apparatus 100 illustrated in FIGS. 2 and 3 has a plurality of first openings 126, and the first openings 126 constitute a primary jet nozzle. The plurality of first openings 126 are used to vigorously supply a large amount of molten solder S to the substrate 200. A second opening 136 of the second supply port 135 is a secondary jet nozzle, and is used to supply the molten solder S to the substrate 200 with weaker force than the first supply port 125. The jet solder supplied from the first supply port 125 is a dynamic supply for vigorously colliding the molten solder S against the substrate 200, and is a supply for spreading the molten solder S to every corner of the substrate 200. On the other hand, the jet solder supplied from the second supply port 135 is a static supply, and is a supply for cleanly attaching the solder to an electrode or the like of the substrate 200 by passing the jet solder through the molten solder S having a gentle flow. The configuration of the jet soldering apparatus and conditions such as a force of the jet of the molten solder are examples, and the present application is not limited to the above configuration.

As illustrated in FIG. 3, a first supply unit 120 has a first housing 121 and the first supply port 125 provided on an upper surface of the first housing 121 and having one or the plurality of first openings 126 for supplying the molten solder S. The first opening 126 may be provided so as to protrude upward from the upper surface of the first housing 121. A second supply unit 130 has a second housing 131 and the second supply port 135 provided on an upper surface of the second housing 131 and having one or a plurality of the second openings 136 for supplying the molten solder S. The first housing 121 and the second housing 131 may be provided apart from each other (see FIG. 3), but they may be provided integrally (see FIGS. 6 and 7). In a case where the first housing 121 and the second housing 131 are integrated, a part of the wall surface may be shared. In the present embodiment, the first supply port 125 having the plurality of circular first openings 126 and the second supply port 135 having one slit-shaped second opening 136 will be described as an example. However, the present invention is not limited to such an aspect, and for example, a plurality of the slit-shaped second openings 136 may be provided. In this case, the plurality of slit-shaped second openings 136 may be provided in an aspect of extending in parallel (see FIG. 9).

A temperature of the molten solder S is generally a melting temperature of the solder +30° C. In recent years, there has been an increasing need to lower a working temperature in order to reduce damage to components and reduce mechanical power consumption. In addition, since the market price of Sn and Ag has soared, it has been examined to use solder that does not use Sn and Ag, and typically, it has been examined to use Sn-58Bi (a solder alloy including Bi: 58% by mass and Sn as a balance. Melting point: 139° C., tensile strength: 76.5 MPs, and elongation: 27%) instead of SAC305 (a solder alloy including: Ag: 3% by mass, Cu: 0.5% by mass, and Sn as a balance. Melting point: 217° C., tensile strength: 53.3 MPs, and elongation: 46%). Sn-58Bi is a low-temperature eutectic solder. Note that, when Sn-58Bi is used, soldering can be performed at a temperature of 200° C. or lower. On the other hand, since Sn-58Bi has a property of being hard and brittle, it is a material difficult to handle.

While the molten solder S is supplied, the molten solder S supplied from the first supply port 125 and the molten solder S supplied from the second supply port 135 are mixed. The molten solder mixed in this manner may not be separated from the substrate 200 conveyed by the conveyance unit 5 between the first supply port 125 and the second supply port 135 (see FIGS. 6 and 7). By adopting such a configuration, it is possible to prevent the molten solder S from being oxidized (generation of oxidized waste). As a result, an amount of solder that becomes unavailable can be suppressed, and material cost can be reduced.

The substrate 200 is supported and conveyed by the conveyance rail 6, but an upper surface of the mixed molten solder S may not be positioned below a lower end of the conveyance rail 6 that conveys the substrate 200 when viewed from a side in an entire length region along the substrate conveyance direction A between the first supply port 125 and the second supply port 135. In the present embodiment, "between the first supply port 125 and the second supply port 135" means between a downstream end in the substrate conveyance direction A of the first supply port 125 and an upstream end in the substrate conveyance direction A of the second supply port 135 (see "G" in FIGS. 2 and 3). Note that in FIGS. 6 and 7, the components other than the first pump 141 and the second pump 146 are illustrated as cross-sectional views when viewed from the side.

The width Z2 of the installation region of the second supply port 135 along the substrate conveyance direction A may be narrower than the width Z1 of the installation region of the first supply port 125 along the substrate conveyance direction A. When such an aspect is adopted, the amount of molten solder S supplied from the second supply port 135 can be easily made smaller than the amount of molten solder S supplied from the first supply port 125. As a result, a plurality of waves (convex shapes) of the molten solder S supplied from the first supply port 125 can be prevented from being crushed by the molten solder S supplied from the second supply port 135, and both dynamic supply of the molten solder S from the first supply port 125 and static supply of the molten solder S from the second supply port 135 can be provided in a well-balanced manner. As illustrated in FIG. 7, when the width Z2 of the installation region of the second supply port 135 along the substrate conveyance direction A is large, it is necessary to perform adjustment so that the amount of the molten solder S to be supplied does not become too large, and at the same time, it is necessary to perform adjustment so that the substrate 200 continues to be in contact with the molten solder S between the second supply port 135 and the first supply port 125, and thus the adjustment is difficult. From this viewpoint, it is advantageous to adopt an aspect in which the width Z2 of the installation region of the second supply port 135 along the substrate conveyance direction A is smaller than the width Z1 of the installation region of the first supply port 125 along the substrate conveyance direction A.

The total amount of molten solder S per unit time supplied from the first openings 126 and the total amount of molten solder S per unit time supplied from the second opening 136 which is the secondary jet nozzle may be changed according to the type of the substrate 200. When identification information of the substrate 200 is input from the operation unit 70, a supply amount of the corresponding molten solder S may be read from the storage unit 60 by the control unit 50, and the molten solder S may be supplied from the first openings 126 and the second opening 136 by being adjusted to the read supply amount. The operation unit 70 may be capable of reading code information such as a bar code, and the control unit 50 may automatically adjust the supply amount of the molten solder S to the substrate 200 by reading the code information of the substrate 200.

The molten solder S supplied from the first openings 126 which are the primary jet nozzle may be jetted to a position higher than a surface of the molten solder S supplied from the second opening 136 which is the secondary jet nozzle. A height of the molten solder S to be jetted is, for example, about 10 mm from a tip of each of the first openings 126. The molten solder S supplied from the second supply port 135 is pushed up by the molten solder S supplied from the first supply port 125. However, since the molten solder S is the same type of liquid, the molten solder S supplied from the first openings 126 and the molten solder S supplied from the second supply port 135 are mixed.

On a downstream side of the second supply port 135 in the substrate conveyance direction A, a downstream adjusting part 182 extending in a horizontal direction or descending downward toward the downstream side may be provided (see FIG. 3). A height of the downstream adjusting part 182 may be appropriately changed. An upstream adjusting part 181 extending in the horizontal direction or rising upward toward the downstream side may be provided on an upstream side of the first supply port 125 in the substrate conveyance direction A. The upstream adjusting part 181 and the downstream adjusting part 182 may be linearly inclined, or may be inclined so as to draw an arc in a longitudinal cross section (see FIG. 6). A height adjustment of the upstream adjusting part 181 and the downstream adjusting part 182 may be manually performed, or may be automatically performed in response to a command from the control unit 50. The command from the control unit 50 may be issued on the basis of the identification information of the substrate 200. Adjusting the heights of the upstream adjusting part 181 and the downstream adjusting part 182 as described above is also advantageous in that the amount of the molten solder S supplied to the substrate 200 can be adjusted.

A height position of the conveyance rail 6 may also be adjustable (see FIG. 3). In a case where such an aspect is adopted, adjusting the height position of the conveyance rail 6 in addition to or instead of controlling the driving force of the first pump 141 and the second pump 146 is also advantageous in that it is possible to realize a configuration in which the substrate 200 continues to be in contact with the molten solder S between the first supply port 125 and the second supply port 135. The height position of the conveyance rail 6 may be manually performed, or may be automatically performed in response to a command from the control unit 50. The command from the control unit 50 may be issued on the basis of the identification information of the substrate 200.

A distance G between the first supply port 125 and the second supply port 135 along the extending direction of the conveyance rail 6 (along the substrate conveyance direction A) may be smaller than the width Z1 of the installation region of the first supply port 125 along the substrate conveyance direction A. When such an aspect is adopted, the distance between the first supply port 125 and the second supply port 135 can be shortened. Therefore, it is advantageous in that it is possible to realize an aspect in which the molten solder S is not separated from the substrate 200 conveyed by the conveyance unit 5 between the first supply port 125 and the second supply port 135 while reducing the amount of the molten solder S supplied from the second supply port 135.

The distance G between the first supply port 125 and the second supply port 135 along the extending direction of the conveyance rail 6 extends may be smaller than the width Z2 of the installation region of the second supply port 135 along the substrate conveyance direction A (distance along the extending direction of the conveyance rail 6). In the present embodiment, as an example, it is assumed that the width Z2 of the installation region of the second supply port 135 along the substrate conveyance direction A is smaller than the width Z1 of the installation region of the first supply port 125 along the substrate conveyance direction A (see FIGS. 3 and 6). Therefore, in a case where this aspect is adopted, the distance between the first supply port 125 and the second supply port 135 can be considerably close (see FIG. 8). When such an aspect is adopted, the distance between the first supply port 125 and the second supply port 135 can be further shortened. Therefore, it is advantageous in that it is possible to realize an aspect in which the molten solder S is not separated from the substrate 200 conveyed by the conveyance unit 5 between the first supply port 125 and the second supply port 135 while further reducing the amount of the molten solder S supplied from the second supply port 135.

The cooling unit may have a lower cooling unit 330 positioned at a position lower than the conveyance rail 6 of the substrate 200 and above the storage tank 110, and an upper cooling unit 310 provided at a position higher than the conveyance rail 6 and an upper position of the storage tank 110. In the present application, "provided at an upper position of the storage tank 110" means that when a straight line is drawn in an upward direction (vertical direction) from an end part of the storage tank 110 to divide the region, at least a part exists in a region xx divided by the straight line. Therefore, the fact that the lower cooling unit 330 is provided at the upper position of the storage tank 110 means that at least a part of the lower cooling unit 330 exists in the region $\alpha$ when the straight line is drawn in the upward direction (vertical direction) from the storage tank 110 to divide the region. Similarly, the fact that the upper cooling unit 310 is provided at the upper position of the storage tank 110 means that at least a part of the upper cooling unit 310 exists in the region $\alpha$ when the straight line is drawn in the upward direction (vertical direction) from the storage tank 110 to divide the region.

Note that the lower cooling unit 330 directly cools the solder attached to the substrate 200, which is large from the viewpoint of a cooling effect. Therefore, when only one of the upper cooling unit 310 and the lower cooling unit 330 is to be installed, installing the lower cooling unit 330 is considered as a first candidate.

In the configuration in the related art, the substrate 200 receives heat from the molten solder S accumulated in the storage tank 110. However, by providing the lower cooling unit 330 at the upper position of the storage tank 110 as in the present embodiment, it is advantageous in that the solder can be cooled by the gas supplied from the lower cooling unit 330 while blocking the influence of the heat from the molten solder S.

By providing the lower cooling unit 330 and the upper cooling unit 310 positioned on the upper side of the storage tank 110, the solder can be cooled immediately after the molten solder S is supplied to the substrate 200 (after two to five seconds as an example), and the solder can be cured. Therefore, it is possible to prevent a decrease in strength of the solder (embrittlement of the solder). In particular, in a case of low-temperature molten solder having a low melting point such as Sn-58Bi, this effect is considerably large. When it takes time to cure the solder, vibration is applied during conveyance in a soft state where the solder is not completely cured, but it is considered that the vibration causes embrittlement of the solder. Incidentally, it takes ten seconds or more to reach the cooling zone existing in the related art, but the present embodiment is different in that the curing of the solder can be started in a considerably shorter time than the time. In the present embodiment, the low-temperature molten solder means solder having a melting point of 180° C. or lower.

By providing the lower cooling unit 330 and/or the upper cooling unit 310 at positions on the downstream side of the first supply port 125 and the second supply port 135 in the conveyance direction of the substrate 200 (a position on the right side in the aspect illustrated in FIG. 3) instead of providing the cooling unit at positions where the supply ports such as the first supply port 125 and the second supply port 135 are provided, it is possible to prevent the molten solder S being supplied from the first supply port 125 and the second supply port 135 from being cooled.

The upper cooling unit 310 and/or the lower cooling unit 330 may have a slit-shaped opening for supplying gas, or may have a plurality of small-diameter openings. The wind speed of the gas supplied from the upper cooling unit 310 and/or the lower cooling unit 330 may be about several meters to several tens of meters per second. The upper cooling unit 310 and the lower cooling unit 330 may supply air at a room temperature as the gas. By providing both the lower cooling unit 330 and the upper cooling unit 310, it is possible to quickly cool the substrate 200 from above and below, and it is possible to more reliably prevent a decrease in strength of the solder (embrittlement of the solder). In addition, in a case where air at a normal temperature is supplied as gas, it is advantageous in that air having a temperature considerably lower than the melting temperature of the solder can be supplied to the substrate 200. In addition, by supplying air instead of nitrogen or the like, it is not necessary to adopt a sealed structure required for supplying nitrogen or the like, and it is advantageous in that the apparatus configuration is simplified and manufacturing can be performed at low cost. In addition, since heat easily accumulates in the sealed structure, it is advantageous to have an open type apparatus configuration also from this viewpoint. In addition, when nitrogen is supplied, splashing of the molten solder tends to increase, but such splashing can be prevented by adopting air. When nitrogen is used, energy for operating the apparatus can be reduced, and the apparatus can be made carbon neutral. The air supplied from the upper cooling unit 310 and/or the lower cooling unit 330 may be cooled by a cooling mechanism such as a chiller, or the outside air may be supplied as it is without providing a cooling mechanism. When the cooling mechanism is not provided, energy used in the apparatus can be reduced.

The upper cooling unit 310 may have an upper main body 311 extending orthogonal to the substrate conveyance direction, and an upper supply port 315 provided on a side surface of the upper main body 311 and jetting and supplying gas such as air (see FIG. 5). The upper supply port 315 may be a linear slit as illustrated in FIG. 5, but may be provided with a plurality of small openings or protruding nozzles (see FIGS. 6 and 7). The upper main body 311 may extend across the pair of conveyance rails 6 as illustrated in FIG. 9, or may extend between the pair of conveyance rails 6 as illustrated in FIG. 2. By providing such an upper cooling unit 310, the entire substrate 200 can be quickly cooled. In particular, when the upper supply port 315 is a linear slit, the substrate 200 can be cooled more uniformly from above. When a nozzle is adopted as the upper supply port 315, a gas supply direction can be determined, the solder can be prevented from being cooled while the solder is being attached to the substrate 200, and the occurrence of solder icicles can be more reliably prevented.

The lower cooling unit 330 may have a lower main body 331 and lower supply ports 335*a* and 335*b* provided from the lower side to the upper side of the conveyance rail 6 of the substrate 200 and jetting and supplying gas such as air (see FIGS. 2, 4, and 9). The lower supply ports 335*a* and 335*b* may be linear slits, or may be provided with a plurality of small openings or protruding nozzles. By providing such a lower cooling unit 330, the substrate 200 can be directly cooled from the side to which the molten solder is attached, and high cooling efficiency can be realized. Even when a nozzle is adopted as the lower supply ports 335*a* and 335*b*, a gas supply direction can be determined, the solder can be prevented from being cooled while the solder is being attached to the substrate 200, and the occurrence of solder icicles can be more reliably prevented.

In the aspect illustrated in FIGS. 2 and 9, the slit-shaped first lower supply port 335*a* and the second lower supply port 335*b* including a plurality of nozzles are provided. The first lower supply port 335*a* has an effect of cooling the solder on the surface and mainly has a function of cooling and curing the solder. In this case, the first lower supply port 335*a* functions as a first cooling unit for cooling the solder. On the other hand, the second lower supply port 335*b* including a plurality of nozzles mainly has a function of cooling the substrate 200, and exerts the effect performed in the cooling zone in the related art. In this case, the second lower supply port 335*b* functions as a second cooling unit for cooling the substrate 200. Adopting such an aspect is advantageous in that the substrate can be cooled by the second lower supply port 335*b* while the solder is quickly cured by the first lower supply port 335*a*.

The first lower supply port 335*a* may be provided with a return part 333 that faces the downstream side in the substrate conveyance direction A and allows the gas supplied from the first lower supply port 335*a* to flow toward the downstream side in the substrate conveyance direction A (see FIG. 4). By adopting such an aspect, it is possible to more reliably prevent the gas such as air supplied from the first lower supply port 335*a* from being supplied while the solder is being attached to the substrate 200. In the aspects illustrated in FIGS. 2 and 9, the return part 333 is not illustrated, but in a case where the return part 333 is provided in FIGS. 2 and 9, the return part 333 is installed so as to cover the entire upper portion of the first lower supply port 335*a*.

The upper supply port 315 may also have a slit-shaped first upper supply port 315*a* and a second upper supply port 315*b* including a plurality of nozzles (see FIG. 6). The first upper supply port 315*a* has an effect of cooling the solder on the surface, and may mainly have a function of cooling and curing the solder. In this case, the first upper supply port 315*a* functions as a first cooling unit for cooling the solder. On the other hand, the second upper supply port 315*b* including a plurality of nozzles mainly has a function of cooling the substrate 200, and may exhibit the effect performed in the cooling zone in the related art. In this case, the second upper supply port 315*b* functions as a second cooling unit for cooling the substrate 200. The first upper supply port 315*a* may also be provided with a return part (not illustrated) that faces the downstream side in the substrate conveyance direction A and allows the gas supplied from the first upper supply port 315*a* to flow toward the downstream side in the substrate conveyance direction A.

From the viewpoint of cooling and curing the solder, only the first lower supply port 335*a* and the first upper supply port 315*a* may be provided, and the second lower supply port 335*b* and the second upper supply port 315*b* may not be provided (see FIG. 7).

Each of the entire upper supply port 315 and the entire lower supply port 335 may be positioned in the region xx that is the upper position of the storage tank 110. When the second upper supply port 315*b* and the second lower supply port 335*b* are provided, each of the entire first upper supply port 315*a* and the entire first lower supply port 335*a* may be positioned in the region α that is the upper position of the storage tank 110, and at least a part of the second upper supply port 315*b* and the second lower supply port 335*b* may be positioned in the region α that is the upper position of the storage tank 110.

The lower cooling unit 330 may be positioned on the downstream side of the upper cooling unit 310 in the conveyance direction of the substrate 200. When the lower cooling unit 330 is too close to the second supply port 135, there is a possibility that the lower cooling unit 330 may be covered with the molten solder S supplied from the first supply port 125 and the second supply port 135, and thus, it is not possible to install the lower cooling unit 330 considerably close to the second supply port 135. On the other hand, since there is a low possibility that the upper cooling unit 310 is covered with the molten solder S supplied from the first supply port 125 and the second supply port 135, the upper cooling unit 310 can be installed close to the second supply port 135 when viewed along the conveyance direction of the substrate 200. Therefore, by adopting an aspect in which the lower cooling unit 330 is positioned on the downstream side of the upper cooling unit 310 in the conveyance direction of the substrate 200, while gas is supplied from the upper cooling unit 310 immediately after solder is attached to the substrate 200, gas can be supplied from a position where the lower cooling unit 330 is not covered with the molten solder S. The fact that the lower cooling unit 330 is positioned on the downstream side of the upper cooling unit 310 in the conveyance direction of the substrate 200 means that an upstream end part (left end in FIG. 3) of the upper cooling unit 310 is positioned on the upstream side (left side in FIG. 3) of the upstream end part (left end in FIG. 3) of the lower cooling unit 330.

The cooling unit may supply gas so that the gas flows along the direction in which the substrate 200 is conveyed. As an example, the upper supply port 315 of the upper cooling unit 310 may be installed so as to jet gas from obliquely above the substrate 200 toward the downstream side of the conveyance direction of the substrate 200. By adopting such an aspect, it is possible to prevent the temperature of the molten solder from lowering while it is being attached to the substrate 200. When the temperature of the molten solder rapidly decreases while the molten solder is being attached to the substrate 200, the molten solder may be hardened before the molten solder is rounded by surface tension, and thus solder icicles may occur. In this regard, in the present aspect, it is possible to prevent the formation of such solder icicles. In particular, in the present embodiment, the cooling unit is provided on the storage tank 110, and the molten solder is cooled at a position extremely close to an area where the molten solder is attached to the substrate 200. Therefore, it is necessary to avoid a temperature decrease in a region where the substrate 200 is attached to the molten solder, and it is advantageous to adopt an aspect in which gas is jetted from obliquely above the substrate 200 toward the downstream side of the conveyance direction of the substrate 200 as in the present aspect. In addition, as described above, in a case where the upper cooling unit 310 is positioned on the upstream side of the lower cooling unit 330 in the conveyance direction of the substrate 200, it is advantageous that the upper supply port 315 is installed so as to jet gas from obliquely above the substrate 200 toward the downstream side of the conveyance direction of the substrate 200 in order to prevent gas such as air supplied from the upper cooling unit 310 from being blown to the molten solder while the molten solder is being attached to the substrate 200.

For the same reason, the lower supply ports 335*a* and 335*b* of the lower cooling unit 330 may also be installed so as to jet gas from obliquely below the substrate 200 toward the downstream side of the conveyance direction of the substrate 200. However, such an aspect may not be adopted in a case where the lower cooling unit 330 is positioned on the downstream side of the upper cooling unit 310 in the conveyance direction of the substrate 200, and the lower cooling unit 330 is farther from the area where the molten solder is attached to the substrate 200 than the upper cooling unit 310. That is, the upper supply port 315 of the upper cooling unit 310 is installed so as to jet gas from obliquely above the substrate 200 toward the downstream side of the conveyance direction of the substrate 200, but the lower supply ports 335*a* and 335*b* of the lower cooling unit 330 may be installed so as to jet gas in the vertical direction with respect to the substrate 200 (see FIG. 10).

In order to jet gas toward the downstream side of the conveyance direction of the substrate 200 in this manner, the above-described return part 333 (the return part that can be installed in the upper cooling unit 310 is not illustrated) may be used.

An aspect may be adopted in which no opening or gap through which the molten solder S falls downward is provided between the first supply port 125 and the second supply port 135 on an upper surface of the first housing 121 and the second housing 131 along the substrate conveyance direction A. When an opening or a gap through which the molten solder S falls downward is provided, a surface area where the molten solder S comes into contact with oxygen increases, and an oxide is generated. On the other hand, in a case of adopting an aspect in which a part where the molten solder S falls, such as an opening or a gap, is not provided between the first supply port 125 and the second supply port 135 along the substrate conveyance direction A as in the present aspect, the molten solder S does not fall between the first supply port 125 and the second supply port 135 along the substrate conveyance direction A, so that generation of an oxide of the molten solder S can be prevented. In addition, in a case where the opening or the gap through which the molten solder S falls downward is not provided, the region where the molten solder S is supplied to the substrate 200 can be shortened, and as a result, it is also advantageous in that the timing of starting the cooling of the solder by the upper cooling unit 310 and the lower cooling unit 330 on the storage tank 110 can be advanced.

Next, an example of a processing method of a substrate 200 will be described mainly with reference to FIG. 11.

When an operator places the substrate 200 on the conveyance rail 6, the conveyance unit 5 conveys the substrate 200, and the substrate 200 is conveyed into the main body 1 from the carry-in port 2. When the substrate 200 reaches the fluxer 10, the fluxer 10 applies flux to a predetermined part of the substrate 200.

The conveyance unit 5 conveys the substrate 200 coated with the flux by the fluxer 10 to the preheater unit 15. The preheater unit 15 heats the substrate 200 to a predetermined temperature.

Next, the conveyance unit 5 conveys the substrate 200 heated to the predetermined temperature by the preheater unit to the jet soldering apparatus 100. The jet soldering apparatus 100 solders a predetermined part of the substrate 200. While the jet soldering apparatus 100 is supplying the molten solder S, the molten solder S supplied from the first supply port 125 and the molten solder S supplied from the second supply port 135 are mixed, and the molten solder S is supplied to above the conveyance rail 6. As an example, the molten solder S is configured not to be separated from the substrate 200 conveyed by the conveyance unit 5 between the first supply port 125 and the second supply port 135. Note that in a state where the substrate 200 does not exist, the molten solder S supplied from the first supply port 125 pushes up the molten solder S supplied from the second supply port 135, and a plurality of convex shapes corresponding to the first openings 126 are formed by the molten solder S.

In this way, immediately after the molten solder S is supplied to the substrate 200 (after three to five seconds as an example), gas such as air is supplied to the substrate 200 from each of the upper cooling unit 310 and the lower cooling unit 330, and the solder is cured. In this way, since the solder is cured immediately after the molten solder S is supplied to the substrate 200, the embrittlement of the solder can be prevented from occurring.

Thereafter, when the conveyance unit 5 discharges the substrate 200 from a carry-out port 3, the soldering processing to the substrate 200 is completed. In the aspect in which the cooling zone is provided, cooling by the cooler 20 is performed after cooling by the gas supplied from each of the upper cooling unit 310 and the lower cooling unit 330, and thereafter, the substrate 200 is discharged from the carry-out port 3 (see FIG. 1).

As a modified example, as shown in FIG. 10, one pump 140 may be provided, and the amount of molten solder S flowing into a first passage 161 connected to the first supply port 125 and the amount of molten solder S flowing into a second passage 162 connected to the second supply port 135 may be adjustable. The amount of the molten solder S flowing into the first passage 161 may be adjusted by a first adjustment valve 166, and the amount of the molten solder S flowing into the second passage 162 may be adjusted by a second adjustment valve 167. The amount of the molten solder S flowing into the first passage 161 and the amount of the molten solder S flowing into the second passage 162 may be adjusted by a relative ratio between an opening degree of the first adjustment valve 166 and an opening degree of the second adjustment valve 167. In a case where this aspect is adopted, the amount of the molten solder S supplied from the first supply port 125 and the amount of the molten solder S supplied from the second supply port 135 can be adjusted while using only one pump 140. The opening degrees of the first adjustment valve 166 and the second adjustment valve 167 may be automatically adjusted in response to a command from the control unit 50 based on the information read from the storage unit 60 on the basis of the identification information of the substrate 200 input by the operation unit 70 (see FIG. 1 and FIG. 11) or read by the operation unit 70.

However, since it is difficult to adjust the amount of the molten solder S using only one pump 140 to a certain extent, in the general jet soldering apparatus 100 in which many types of substrates 200 have to be treated in one day, it is advantageous that the amount of the molten solder S supplied from the first supply port 125 and the second supply port 135 can be adjusted using two or more pumps as described above.

As another aspect, sizes of the inlets of the first passage 161 and the second passage 162 may be appropriately adjusted while using only one pump 140. In this case, by manually or automatically adjusting the sizes of the inlets of the first passage 161 and the second passage 162, the amount of the molten solder S supplied from the first supply port 125 and the amount of the molten solder S supplied from the second supply port 135 can be adjusted.

A plurality of the pumps 140 may also be provided also in this modified example. Also in this case, the amount of the molten solder S supplied from the first supply port 125 and the amount of the molten solder S supplied from the second supply port 135 may be adjustable by adjusting the opening degrees of the first adjustment valve 166 and the second adjustment valve 167 and the sizes of the inlets of the first passage 161 and the second passage 162.

One or both of the upper cooling unit 310 and the lower cooling unit 330 may be of a replacement type, and the size or the like thereof may be changed by replacement (see FIG. 12). By adopting such an aspect, the positions of the upper supply port 315 and the lower supply ports 335*a* and 335*b* can be changed as necessary. One or both of the upper cooling unit 310 and the lower cooling unit 330 may be movable along the horizontal direction (see FIG. 13). Wind directions of the upper cooling unit 310 and the lower cooling unit 330 may be changed. For example, the wind direction from the upper cooling unit 310 may be changeable by the upper cooling unit 310 being rotatable along an axis extending in a direction orthogonal to the substrate conveyance direction A in the horizontal direction. Further, the wind direction from the lower cooling unit 330 may be changeable by changing the direction of the protruding nozzle of the lower cooling unit 330. By adopting such an aspect, the positions of the upper supply port 315 and the lower supply ports 335*a* and 335*b* can be appropriately changed. Note that regarding the lower cooling unit 330, the positions of the lower supply ports 335*a* and 335*b* in the horizontal direction may be adjustable by being extendable (an aspect of a movable aspect) along the horizontal direction. One or both of the upper cooling unit 310 and the lower cooling unit 330 may be movable also in the vertical direction. In the present application, "along the horizontal direction" may be any direction including a component in the horizontal direction, and includes an aspect of moving along an oblique direction with respect to the horizontal direction. Similarly, "along the vertical direction" may be any direction including a component in the vertical direction, and also includes an aspect of moving along an oblique direction with respect to the vertical direction.

A measurement unit 400 that measures the temperature of the substrate 200 after being cooled by the upper cooling unit 310 and the lower cooling unit 330 may be provided (see FIGS. 14 to 17). By measuring the temperature of the substrate 200 conveyed by the measurement unit 400 in this manner, it is possible to check and manage whether or not solder curing or cooling immediately after soldering for achieving the solder curing is appropriately performed. In a case of an aspect in which the cooler 20 is installed, the measurement unit 400 may be installed at a position before the substrate 200 is cooled by the cooler 20. As an example, the measurement unit 400 may be installed immediately downstream side of the lower cooling unit 330 in the substrate conveyance direction A (see FIGS. 16 and 17). Here, "immediately downstream side in the substrate conveyance direction A" means a region within 30 cm from a downstream end part of the member positioned on the downstream side in the substrate conveyance direction A, of the upper cooling unit 310 and the lower cooling unit 330. The measurement unit 400 may be, for example, a thermometer sensor.

A display unit 410 that displays the temperature of the substrate 200 measured by the measurement unit 400 may be provided (see FIGS. 14 and 16). The display unit 410 may be, for example, a thermometer display. By providing such a display unit 410, the operator can easily check the temperature of the substrate 200.

As an example, the temperature of the cooled substrate 200 on the soldering surface side (lower side) is measured by the measurement unit 400 installed on the downstream side of the upper cooling unit 310 and the lower cooling unit 330 in the substrate conveyance direction A. Then, a temperature measurement result is transmitted to a thermometer amplifier 405 (see FIG. 14). Then, the thermometer amplifier 405 transmits the temperature measurement result to the display unit 410, and the temperature measurement result is displayed on the display unit 410. However, the present invention is not limited to such an aspect, and the measurement result by the measurement unit 400 may be directly transmitted to the display unit 410, and the measurement result may be displayed on the display unit 410. Note that the function of the thermometer amplifier 405 is typically to convert a measurement signal of the measurement unit 400 into a signal that can be understood by the display unit 410. Therefore, in a case where the signal that can be understood by the display unit 410 can be transmitted from the measurement unit 400 to the display unit 410, it is not particularly necessary to install the thermometer amplifier 405.

The measurement unit 400 may be attached to a guide part 440 including a slide rail or the like extending in the horizontal direction, in a direction orthogonal to the substrate conveyance direction A (see FIGS. 14 and 15A). In this case, the measurement unit 400 is movable along the guide part 440. Further, angle adjustment and vertical height adjustment of the measurement unit 400 with respect to the guide part 440 may be possible (see FIG. 15B). In addition, the position of the guide part 440, which includes a slide rail or the like, in the vertical direction may be changeable. Further, the position of the guide part 440 along the substrate conveyance direction A may be changeable.

FIGS. 14, 15A, and 15B illustrate an example. In the aspect illustrated in FIG. 14, a pair of first vertical adjustment adjusting bolts 460 are illustrated, and by loosening the first vertical adjustment adjusting bolts 460, the guide part 440 becomes movable in the vertical direction along a vertically long guide hole 470*a* provided in a vertical extension portion 470, and by tightening the first vertical adjustment adjusting bolts 460, the position of the guide part 440 in the vertical direction with respect to the vertical extension portion 470 is fixed. In the aspect illustrated in FIG. 15A, a knurling knob 441 is illustrated, and by loosening the knurling knob 441, a measurement unit fixing member 443 to which the measurement unit 400 is attached can move along the guide part 440, and by tightening the knurling knob 441, the position of the measurement unit fixing member 443 in the horizontal direction with respect to the guide part 440 is fixed. In the aspect illustrated in FIG. 15B, a second vertical adjustment adjusting bolt 442 is illustrated, and by loosening the second vertical adjustment adjusting bolt 442, the measurement unit fixing member 443 becomes movable in the vertical direction (movable with respect to the guide part 440) in a form of being guided by a vertically long guide hole 443*a* provided in the measurement unit fixing member 443, and the position of the measurement unit fixing member 443 with respect to the guide part 440 in the vertical direction is fixed by tightening the second vertical adjustment adjusting bolt 442.

When the temperature of the substrate measured by the measurement unit 400 is out of a predetermined temperature range, the control unit 50 may transmit a signal such as a control signal for stopping the carry-in of the substrate 200 to an external device 500 (see FIG. 17) positioned on the upstream side of the jet soldering apparatus 100 such as a component mounting device. When such an aspect is adopted, in a case where there is a high possibility that the solder curing or the cooling immediately after the soldering for achieving the solder curing is not appropriately performed, it is possible to forcibly stop the substrate 200 from being carried in from the external device 500 positioned on the upstream side of the jet soldering apparatus 100. The predetermined temperature range may be input from the operation unit 70 or may be read from information stored in the storage unit 60.

When the temperature of the substrate measured by the measurement unit 400 is out of the predetermined temperature range, a notification unit 430 such as an alarm device that notifies that the temperature of the substrate 200 is out of the predetermined temperature range may be provided (see FIG. 14). When such an aspect is adopted, in a case where there is a high possibility that the solder curing or the cooling immediately after the soldering for achieving the solder curing is not appropriately performed, it is possible to notify the operator or the like of the fact. Information may be transmitted to the notification unit 430 directly from the measurement unit 400 or via the thermometer amplifier 405 or the like. Note that the display unit 410 may function as the notification unit. In this case, the display unit 410 may display a warning when the temperature of the substrate 200 is out of the predetermined temperature range.

The above description of any embodiments including the modified example and the disclosure of the drawings are merely examples for describing the invention defined in the claims, and the invention defined in the claims is not limited by the above description of the embodiment and the disclosure of the drawings. In addition, the description of the claims at the time of filing is only an example, and the description of the claims can be changed as appropriate based on the description of the description, drawings, and the like.

REFERENCE SIGNS LIST

6 conveyance rail
100 jet soldering apparatus
110 storage tank
121 first housing
125 first supply port
131 second housing
135 second supply port
200 substrate
310 upper cooling unit
330 lower cooling unit
S molten solder

The invention claimed is:

1. A jet soldering apparatus comprising:
a storage tank configured to store molten solder;
a supply port for supplying the molten solder to a substrate; and
a cooling unit that is positioned on a downstream side of the supply port in a conveyance direction of the substrate, is provided at an upper position of the storage tank, and is configured to supply gas,
wherein the cooling unit has a slit-shaped first supply port for supplying the gas and a second supply port including a plurality of openings or nozzles for supplying the gas, and
wherein when straight lines are drawn in an upward direction from end parts of the storage tank, entire part of the slit-shaped first supply port, entire part of the second supply port, or both entire part of the slit-shaped first supply port and entire part of the second supply port is located between the straight lines.

2. The jet soldering apparatus according to claim 1,
wherein the cooling unit has a lower cooling unit configured to supply the gas from below to the substrate conveyed, and an upper cooling unit configured to supply the gas from upper to the substrate conveyed.

3. The jet soldering apparatus according to claim 2,
wherein the lower cooling unit is positioned on a downstream side of the upper cooling unit in the conveyance direction of the substrate.

4. The jet soldering apparatus according to claim 1, wherein the cooling unit supplies the gas toward a downstream side of the conveyance direction of the substrate.

5. The jet soldering apparatus according to claim 4,
wherein the cooling unit has a lower cooling unit configured to supply the gas from below to the substrate conveyed, and an upper cooling unit configured to supply the gas from upper to the substrate conveyed,
wherein the upper cooling unit supplies the gas toward obliquely downward along the conveyance direction of the substrate, and
wherein the lower cooling unit supplies the gas toward obliquely upward along the conveyance direction of the substrate.

6. The jet soldering apparatus according to claim 1, wherein the cooling unit has a first cooling unit for cooling the solder supplied to the substrate, and a second cooling unit for cooling the substrate.

7. The jet soldering apparatus according to claim 1, wherein the cooling unit supplies air at a room temperature as the gas.

8. The jet soldering apparatus according to claim 1,
wherein the supply port has a first supply port for supplying the molten solder provided at a first housing, and a second supply port for supplying the molten solder provided at a second housing, and
wherein a part where the molten solder falls is not provided between the first supply port and the second supply port along the conveyance direction of the substrate.

9. The jet soldering apparatus according to claim 1 comprising a measurement unit that measures a temperature of the substrate after being cooled by the cooling unit.

10. The jet soldering apparatus according to claim 9 comprising a display unit that displays the temperature of the substrate measured by the measurement unit.

11. The jet soldering apparatus according to claim 9,
wherein when the temperature of the substrate measured by the measurement unit is out of a predetermined temperature range, a signal is transmitted for stopping a carry-in of the substrate.

12. The jet soldering apparatus according to claim 9 comprising a notification unit that notifies that the temperature of the substrate is out of a predetermined temperature range when the temperature of the substrate measured by the measurement unit is out of the predetermined temperature range.

13. The jet soldering apparatus according to claim 1 comprising a return part configured to allow the gas supplied from the first supply port to flow toward the downstream side in the conveyance direction of the substrate.

14. The jet soldering apparatus according to claim 1, wherein the cooling unit has a slit-shaped first lower supply port for supplying the gas from below to the substrate conveyed, and a second lower supply port including a plurality of openings or nozzles for supplying the gas from below to the substrate conveyed, or has a slit-shaped first upper supply port for supplying the gas from above to the substrate conveyed, and a second upper supply port including a plurality of openings or nozzles for supplying the gas from above to the substrate conveyed.

15. A jet soldering apparatus comprising:

a storage tank configured to store molten solder;

a supply port for supplying the molten solder to a substrate; and a cooling unit that is positioned on a downstream side of the supply port in a conveyance direction of the substrate, is provided at an upper position of the storage tank, and is configured to supply gas, wherein the cooling unit has a lower cooling unit that has a second supply port including a plurality of openings or nozzles and supplies the gas from below to the substrate conveyed, and an upper cooling unit that has a slit-shaped first supply port and supplies the gas from above to the substrate conveyed, and wherein when straight lines are drawn in an upward direction from end parts of the storage tank, entire part of the slit-shaped first supply port, entire part of the second supply port, or both entire part of the slit-shaped first supply port and entire part of the second supply port is located between the straight lines.

* * * * *